(12) United States Patent
Mukherjee

(10) Patent No.: US 11,431,487 B2
(45) Date of Patent: *Aug. 30, 2022

(54) ADAPTIVE ATTACK RESISTANT DISTRIBUTED SYMMETRIC ENCRYPTION

(71) Applicant: Visa International Service Association, San Francisco, CA (US)

(72) Inventor: Pratyay Mukherjee, Sunnyvale, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 41 days.

This patent is subject to a terminal disclaimer.

(21) Appl. No.: 16/861,138

(22) Filed: Apr. 28, 2020

(65) Prior Publication Data

US 2021/0336771 A1  Oct. 28, 2021

(51) Int. Cl.
*H04L 9/08* (2006.01)
*H04L 9/32* (2006.01)

(52) U.S. Cl.
CPC .......... *H04L 9/085* (2013.01); *H04L 9/0838* (2013.01); *H04L 9/0869* (2013.01); *H04L 9/3236* (2013.01); *H04L 9/3247* (2013.01)

(58) Field of Classification Search
CPC ..... H04L 9/085; H04L 9/0838; H04L 9/0869; H04L 9/3236; H04L 9/3247
See application file for complete search history.

(56) References Cited

U.S. PATENT DOCUMENTS 5,625,692 A     4/1997  Herzberg et al.
7,590,236 B1 *  9/2009  Boneh ................. H04L 63/0428
                                                      380/277

(Continued)

FOREIGN PATENT DOCUMENTS

EP    3461059 A1 *  3/2019  .......... G06F 11/2023
WO  2016176070 A1   11/2016

(Continued)

OTHER PUBLICATIONS

Machine translation of Chinese patent application CN 110138567 A, MA et al. (Year: 2019).*

(Continued)

*Primary Examiner* — Shanto Abedin
(74) *Attorney, Agent, or Firm* — Kilpatrick Townsend & Stockton LLP

(57) ABSTRACT

Systems and methods for adaptive attack resistant distributed symmetric cryptography are disclosed. A client computer may communicate with a number of cryptographic devices in order to encrypt or decrypt data. Each cryptographic device may possess multiple secret shares corresponding to distinct secret values, which may be used in the process of encrypting or decrypting data. The client computer may generate multiple commitments and transmit those commitments to the cryptographic devices. Each cryptographic device may generate a partial computation based on the commitments and their respective secret shares. The partial computations may be transmitted to the client computer. The client computer may use the partial computations to generate a cryptographic key. The client computer may use the cryptographic key to encrypt a message or decrypt ciphertext.

17 Claims, 10 Drawing Sheets

(56) References Cited

U.S. PATENT DOCUMENTS

| | | | |
|---|---|---|---|
| 9,979,551 B2 | 5/2018 | Joye et al. | |
| 2004/0030932 A1* | 2/2004 | Juels | H04W 12/126 |
| | | | 713/151 |
| 2008/0313465 A1* | 12/2008 | B. Gentry | H04L 9/3255 |
| | | | 713/176 |
| 2009/0198619 A1 | 8/2009 | Tripunitara et al. | |
| 2014/0101440 A1* | 4/2014 | Hermoni | H04L 9/085 |
| | | | 713/156 |
| 2015/0229480 A1 | 8/2015 | Joye et al. | |
| 2016/0072623 A1* | 3/2016 | Joye | H04L 9/3255 |
| | | | 380/28 |
| 2016/0080336 A1* | 3/2016 | Ryan | H04L 9/0891 |
| | | | 713/171 |
| 2017/0243193 A1* | 8/2017 | Man | G06Q 20/065 |
| 2018/0278594 A1* | 9/2018 | Schiffman | H04L 9/3271 |
| 2020/0014534 A1 | 1/2020 | Garcia Morchon et al. | |
| 2021/0089676 A1* | 3/2021 | Ford | H04L 9/3218 |
| 2021/0167963 A1* | 6/2021 | Autry | H04L 9/3239 |

FOREIGN PATENT DOCUMENTS

| | | | |
|---|---|---|---|
| WO | 2019088979 A1 | 5/2019 | |
| WO | WO-2019088979 A1 * | 5/2019 | H04L 9/3218 |

OTHER PUBLICATIONS

Application No. PCT/US2021/029429, International Search Report and Written Opinion, dated Aug. 6, 2021, 15 pages.

\* cited by examiner

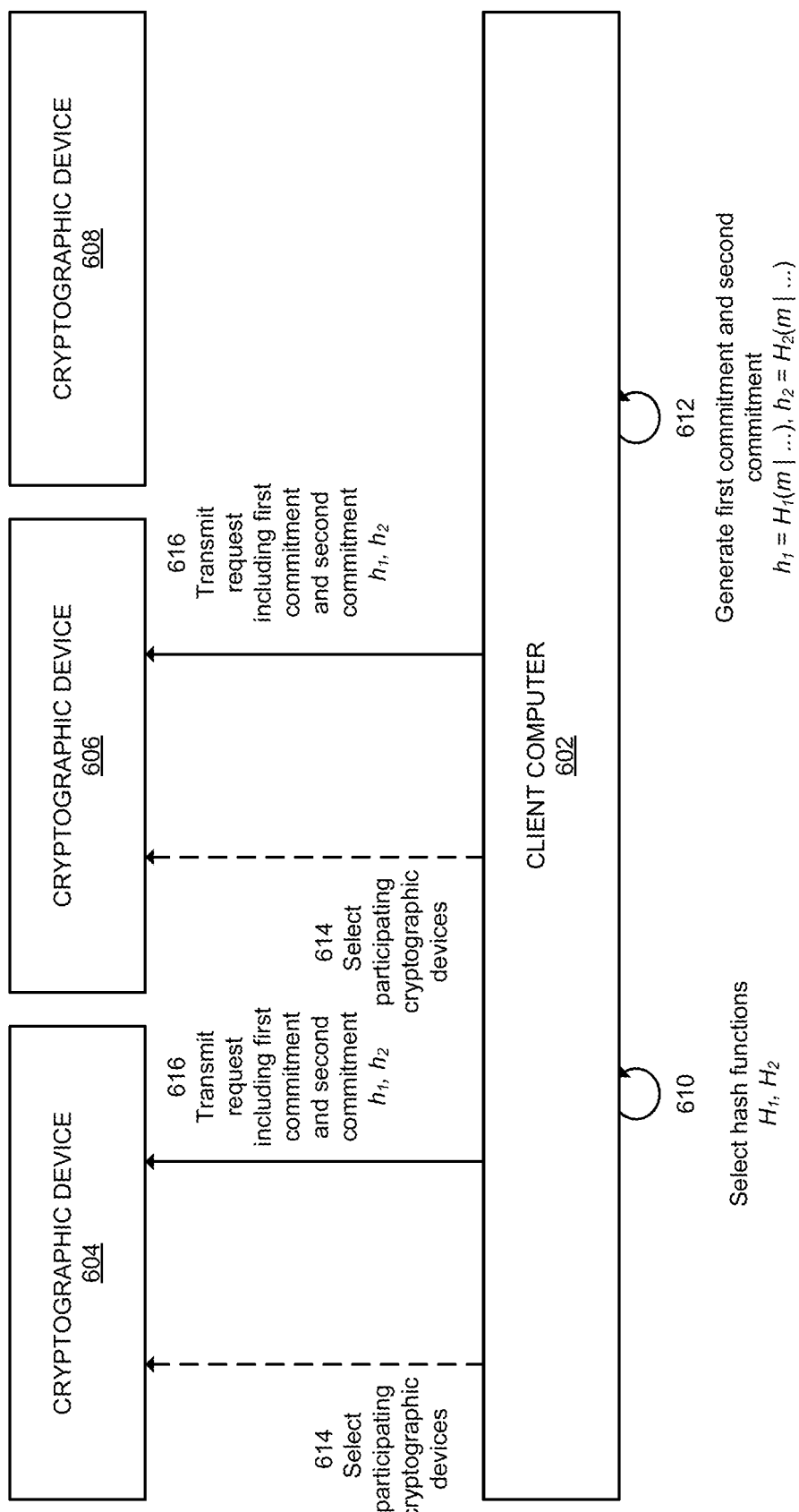

ADAPTIVE ATTACK RESISTANT DISTRIBUTED SYMMETRIC ENCRYPTION

BACKGROUND

"Cryptography as a service" may refer to processes where one entity performs cryptographic operations on behalf of another entity. For example, a server computer may encrypt data (such as sensitive medical records or other private documents) on behalf of a client computer. At a later time, when the client computer wants to retrieve the encrypted data, the client computer may communicate with the server computer in order to decrypt the encrypted data. Alternatively or additionally, the client computer can transmit the encrypted data to another client computer. This other client computer may communicate with the server computer in order to decrypt the encrypted data. Thus cryptography as a service may be used to protect data across either time or space. Cryptography as a service may be desirable because servers may be better equipped than client computers to store sensitive cryptographic information, such as secret cryptographic keys.

Some cryptographic operations can be categorized as symmetric or asymmetric. With symmetric cryptography, the same cryptographic key can be used to encrypt and decrypt data. With asymmetric cryptography, two cryptographic keys are used. Data encrypted using one cryptographic key must be decrypted using the other, and vis-versa. Asymmetric cryptography is typically much slower than symmetric cryptography, in some cases, up to three to five orders of magnitude slower. As a result, symmetric cryptography is usually preferable for high speed or high throughput cryptography as a service applications.

Distributed cryptography using a shared secret is one technique that can be used to implement cryptography as a service. Rather than a single server computer performing cryptography for a client computer, a distributed network of cryptographic devices (e.g., server computers) can collectively perform cryptography for the client computer. Cryptographic materials, such as a secret key or shared secret can be divided into secret shares and distributed among the cryptographic devices. Those cryptographic devices and the client computer can collectively perform encryption or decryption using their respective secret shares. Distributed cryptography may provide security benefits when compared to conventional cryptography, because it is more difficult for an attacker to acquire the shared secret. An attacker must acquire multiple secret shares to reconstruct the secret key or shared secret or otherwise compromise the cryptosystem.

Although distributed symmetric cryptographic systems are generally more secure than comparable non-distributed systems, they still may be vulnerable to attack. A hacker may attempt to corrupt one or more cryptographic devices in a distributed symmetric cryptographic system in order to acquire their secret shares and/or compromise the system. Cryptographic attacks are sometimes categorized into different attack models. Some attacks are "static attacks" and others are "dynamic attacks" or "adaptive attacks." Many conventional distributed symmetric cryptography systems are vulnerable to dynamic attacks and adaptive attacks.

Thus, there is a need for improvements to distributed symmetric encryption to address dynamic attacks.

SUMMARY

Embodiments are directed to systems and methods for adaptive attack resistant distributed symmetric cryptography. A client computer and a plurality of cryptographic devices from a cryptographic device network can work together to generate a symmetric cryptographic key. This cryptographic key can be used by the client computer to encrypt or decrypt a message. For example, the client computer and cryptographic devices can encrypt a message (such as sensitive personal or banking information) to produce a ciphertext, and then the client computer can store the ciphertext. At a later time, the client computer and the cryptographic devices can decrypt the ciphertext to produce the message. In another use case, the client computer can send the ciphertext to another client computer. The other client computer and the cryptographic devices can then decrypt the ciphertext and retrieve the message, allowing messages to be sent securely over unsecure networks (such as the Internet).

Generally, during an encryption or decryption process, the cryptographic devices can provide partial computations to the client computer. These partial computations can be derived from secret shares stored by each cryptographic device. The client computer can combine these partial computations to produce a symmetric encryption key. The client computer can use the symmetric cryptographic key to either encrypt a message or decrypt a ciphertext.

Unlike other distributed cryptography systems, each cryptographic device can possess multiple secret shares, derived from different shared secrets. In some embodiments, each cryptographic device can possess a first secret share derived from a first secret value and a second secret share derived from a second secret value. Each cryptographic device can generate partial computations derived from each of the secret shares (e.g., a first partial computation generated from the first secret share and a second partial computation generated from the second secret share). These partial computations can be combined and provided to the client computer, which can then use the partial computations to produce the cryptographic key.

A benefit of using multiple secret shares and multiple secret values is that the distributed computation used to generated the cryptographic key is not bound to any particular set (or "tuple") of secret values or secret shares. Instead, there are an exponentially large number of secret values and secret shares that are equally likely to have been used to produce the cryptographic key. As a result, it is impossible for an attacker to determine the exact secret values or secret shares even if the attacker has unbounded computational resources. As such, an attacker cannot determine the secret shares even while performing an adaptive attack. By contrast, in non-adaptive distributed cryptography systems, the distributed computation may be bound to a specific secret, allowing an attacker to use adaptive attacks that may exploit correlations between different partial computations. As a result, the attacker may be able to acquire sensitive cryptographic materials, or otherwise breach the non-adaptive cryptosystem.

Some embodiments provide for additional security features, such as verifying legitimate use of the distributed cryptographic system using verification signatures, logging or otherwise tracking use of the distributed system using log files, and verifying partial computations using Honest Verifier Zero Knowledge (HVZK) proofs.

As an example, during encryption, the client computer and cryptographic devices can generate partial signatures, which can be combined into a verification signature. During decryption, the client computer can provide the verification signature to the cryptographic devices. The cryptographic devices can verify the verification signature using a verification key. If the verification signature is legitimate, the cryptographic devices can determine that the client computer is performing a legitimate decryption operation. The presence or absence of a verification signature can indicate to the cryptographic devices that the client computer is decrypting or encrypting a message respectively. However, the client computer can also transmit an indicator to the cryptographic devices, indicating whether the client computer is encrypting or decrypting data. The cryptographic devices can record the indicator or verification signature in a log file as a record indicating that the client computer encrypted or decrypted a message.

Additionally, the client computer can use HVZK proofs in order to verify partial computations transmitted by the cryptographic devices. The client computer can retrieve check values, either from a trusted server or its own memory. These check values correspond to secret shares corresponding to each partial computation. Using these check values, the client computer can verify that the partial computations are legitimate, however, the client computer cannot determine the secret shares from either the check values or the partial computation. As such, the secret shares are protected even against malicious client computers.

One embodiment is directed to a method comprising performing, by a computer system: generating a first commitment using a message and a first hash function; generating a second commitment using the message and a second hash function; transmitting a request including the first commitment and the second commitment to each of a plurality of cryptographic devices, the plurality of cryptographic devices storing a first plurality of secret shares that are generated from a first secret value and a second plurality of secret shares that are generated from a second secret value; receiving, from the plurality of cryptographic devices, a plurality of partial computations, wherein each partial computation of the plurality of partial computations was generated by a respective one of the plurality of cryptographic devices using a respective first partial computation and a respective second partial computation, wherein the respective first partial computation is generated using a respective first secret share and the first commitment, and wherein the respective second partial computation is generated using a respective second secret share and the second commitment; generating a cryptographic key based on the plurality of partial computations; generating a ciphertext by encrypting the message using the cryptographic key; and generating a payload comprising the ciphertext, the first commitment, and the second commitment.

Another embodiment is directed to a method comprising performing, by a computer system: receiving a payload comprising a ciphertext, a first commitment, and a second commitment; transmitting a request including the first commitment and the second commitment to each of a plurality of cryptographic devices, the plurality of cryptographic devices storing a first plurality of secret shares that are generated from a first secret value and a second plurality of secret shares that are generated from a second secret value; receiving, from the plurality of cryptographic devices, a plurality of partial computations, wherein each partial computation of the plurality of partial computations was generated by a respective one of the plurality of cryptographic devices using a respective first partial computation and a respective second partial computation, wherein the respective first partial computation is generated using a respective first secret share and the first commitment, and wherein the respective second partial computation is generated using a respective second secret share and the second commitment; generating a cryptographic key based on the plurality of partial computations; and decrypting the ciphertext using the cryptographic key to produce a message.

Another embodiment is directed to a method comprising performing, by a cryptographic device: receiving, from a client computer, a request including a first commitment generated using a message and a first hash function, and a second commitment generated using the message and a second hash function; generating a first partial computation based on the first secret share and the first commitment; generating a second partial computation based on a second secret share and the second commitment; generating a partial computation by combining the first partial computation and the second partial computation; and transmitting the partial computation to the client computer, thereby enabling the client computer to: (1) generate a cryptographic key using the partial computation, (2) encrypt the message using the cryptographic key, thereby generating a ciphertext, and (3) generate a payload comprising the ciphertext, the first commitment, and the second commitment.

These and other embodiments of the disclosure are described in detail below. For example, other embodiments are directed to systems, devices, and computer readable media associated with methods described herein.

Prior to discussing specific embodiments of the invention, some terms may be described in detail.

Terms

A "server computer" may include a powerful computer or cluster of computers. For example, the server computer can include a large mainframe, a minicomputer cluster, or a group of servers functioning as a unit. In one example, the server computer can include a database server coupled to a web server. The server computer may comprise one or more computational apparatuses and may use any of a variety of computing structures, arrangements, and compilations for servicing the requests from one or more client computers.

A "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

The term "cryptographic key" may include data used in encryption or decryption. For example, a cryptographic key may refer to a product of two large prime numbers. A cryptographic key may be used in a cryptosystem such as RSA (Rivest, Shamir, Adleman) or AES (Advanced Encryption Standard), and may be used to encrypt plaintext and produce a ciphertext output, or decrypt ciphertext and produce a plaintext output. Cryptographic keys may be symmetrical, in which case the same key is used for encryption and decryption, or asymmetrical, in which case different keys are used for encryption and decryption.

The term "plaintext" may refer to text that is in unencrypted or plain form. For example, this may refer to text that can be interpreted by a human or a computer without any processing, such as the phrase "hello, how are you?" Numbers or other symbols may also qualify as plaintext.

The term "ciphertext" may refer to text that is in an encrypted form. For example, this could refer to text that must be decrypted before it can be interpreted by a human or computer. Ciphertext may be generated using any cryptographic algorithm or cryptosystem, such as RSA or AES.

A "client computer" may refer to a computer that uses the services of other computers or devices, such as server computers. A client computer may connect to these other computers or devices over a network such as the Internet. As an example, a client computer may comprise a laptop computer that connects to an image hosting server in order to view images stored on that image hosting server.

A "cryptographic device" may refer to any device that may perform cryptographic operations, including encryption and decryption. A cryptographic device may participate in distributed or multi-party cryptography. Examples of cryptographic devices include server computers, hardware security modules, desktop computers, laptops, smartphones, smart watches, or other portable electronic devices. A cryptographic device may possess a "secret," or "secret share."

A "proxy device" may refer to a device that acts as a proxy. A proxy device may perform operations on behalf of other devices. For example, a proxy device may receive and transmit messages or other data on behalf of other devices. A proxy device that acts to route communications between other devices in a network of devices may be referred to as a "hub device."

The term "multi-party computation" may refer to a computation that is performed by multiple parties. Each party, such as a computer, server, or cryptographic device, may have some inputs to the computation. Each party can collectively calculate the output of the computation using the inputs.

The term "secure multi-party computation" may refer to a multi-party computation that is secure. In some cases, "secure multi-party computation refers to a multi-party computation in which the parties do not share information or other inputs with each other. An example is Yao's Millionaires' problem, in which two millionaires want to determine which one is more wealthy without revealing their wealth to one another.

A "secret value" or "secret" may refer to a value or thing kept hidden as part of a cryptographic process. The security of the cryptographic process may rely on the secret value remaining secret. A secret may include a cryptographic key or a "secret share." Exposure of the secret may allow parties other than the intended parties to encrypt or decrypt messages.

A "shared secret" may refer to a secret value or thing shared between multiple parties. For example, a shared secret may be a cryptographic key, divided up such that multiple parties each possess a fraction of that cryptographic key. As an example, two parties may each possess 64 bits of a shared secret comprising a 128 bit cryptographic key.

A "secret share" may refer to a value derived from a shared secret. As an example, a secret share may comprise the first 64 bits of a 128 bit secret value. A secret share may also comprise a secret value combined with a number or other data. In some cases, multiple secret shares may be combined to reproduce a shared secret.

A "hash function" may refer to any function that can be used to map data of arbitrary length or size to data of fixed length or size. A hash function may be used to obscure data by replacing it with its corresponding "hash value." Hash functions may be used to generate "commitments" or "commitment messages" data that may be used to evaluate the integrity of encrypted data.

A "commitment" or "commitment message" may refer to data that may be used to verify that a course of action has been committed to. In the context of cryptography, a commitment may refer to a message that may be used to verify that an encrypted message was not tampered with. Before a message is encrypted, a commitment can be produced based on the message, e.g., via a hash function. This commitment can be sent alongside the encrypted message. Once the message is decrypted, the recipient can generate its own commitment message using the same hash function. The received commitment message and the generated commitment message can be compared to verify the integrity of the encrypted message.

A "pseudorandom function" may refer to a deterministic function that produces an output that appears random. Pseudorandom functions may include collision resistant hash functions and elliptic curve groups. A pseudorandom function may approximate a random oracle, an ideal cryptographic primitive that maps an input to a random output from its output domain. A pseudorandom function can be constructed from a pseudorandom number generator.

A "random nonce" or "cryptographic nonce" may refer to a random value (e.g., a random number) that may be used in a cryptographic process, preferably a limited number of times. A random nonce may be randomly or pseudo-randomly generated, and may be used in conjunction with cryptographic hash functions. A random nonce may prevent some cryptographic attacks, such as the "replay attack."

A "honest verifier zero-knowledge proof of knowledge" (also referred to as an HVZK proof) may refer to a zero-knowledge proof of knowledge performed by an honest verifying entity. An honest verifying entity is an entity (e.g., a client computer) that participates in a cryptographic protocol non-maliciously (e.g., without changing their inputs or outputs) and according to the rules of the protocol. An HVZK proof can be used to verify the legitimacy of information (such as a secret share) without learning anything else about the information.

A "verification value" may refer to data used to verify a computation, fact, or knowledge. An example of a verification value is a non-interactive zero-knowledge proof of knowledge, as discussed above. Another example of a verification value is a cryptographic key. As an example, a private cryptographic key may be used to verify the identity of the person or computer possessing that cryptographic key by signing or encrypting data using that private cryptographic key. A verification value comprising a cryptographic key may be referred to as a "verification key."

A "verification share" may refer to part of a verification value, or data derived from a verification value. A plurality of verification shares may be combined in some manner to produce the corresponding verification value. For example, the product of a collection of verification shares may be equal to the corresponding verification value.

A "signature," "digital signature," or "verification signature" may refer to data used to verify the authenticity of data using cryptography. A computer may digitally sign data by encrypting that data using a cryptographic key known only to that computer (i.e., a private key). Other computers may verify the signature by decrypting the data using a publically known cryptographic key corresponding to that computer (i.e., a public key). A verification signature may be used to verify either the source of the signed data or the veracity of the signed data.

A "partial signature" may refer to part of a digital signature. A partial signature, when combined with other partial signatures may reproduce the digital signature. For example, the exclusive-OR of a plurality of partial signatures may be used to reproduce a digital signature.

A "partial computation" may refer to part of a computation. Multiple partial computations may be combined to produce the output of the computation. For example, the volume of multiple solids may comprise partial computations of the total volume of those solids, and those partial computations may be combined via addition. Partial computations may be generated by multiple parties or cryptographic devices participating in a multi-party computation.

A "message" may refer to any data that may be transmitted between two entities. A message may comprise plaintext data or ciphertext data. A message may comprise alphanumeric sequences (e.g., "hello123") or any other data (e.g., image or video files). Messages may be transmitted between computers or other entities A "payload" may refer to information in a transmitted message. A payload may exclude automatically generated metadata. A payload may comprise multiple data elements. For example, a payload corresponding to human vital statistics may comprise three data values corresponding to the weight, height, and age of a human.

A "key generation seed" may refer to a value or other data used to generate a cryptographic key. For example, a key generation seed may be a number such as "12034024." A key generation seed may be used as the input to a random or pseudorandom function to generate the cryptographic key. Key generation functions may be consistent, that is, identical key generation seeds generate identical cryptographic keys.

A "log file" may comprise a data file that stores a record of information. For example, a log file may comprise records of use of a particular service, such as distributed cryptography. A log file may contain additional information, such as a time associated with use of the service, an identifier associated with a client using the service, the nature of the use of the service (for example, whether a client is encrypting or decrypting data), etc.

BRIEF DESCRIPTION OF THE DRAWINGS

FIG. 6A shows a hybrid sequence diagram for a first part of an exemplary method of adaptive attack resistant distributed symmetric encryption.

DETAILED DESCRIPTION

Figure 1:
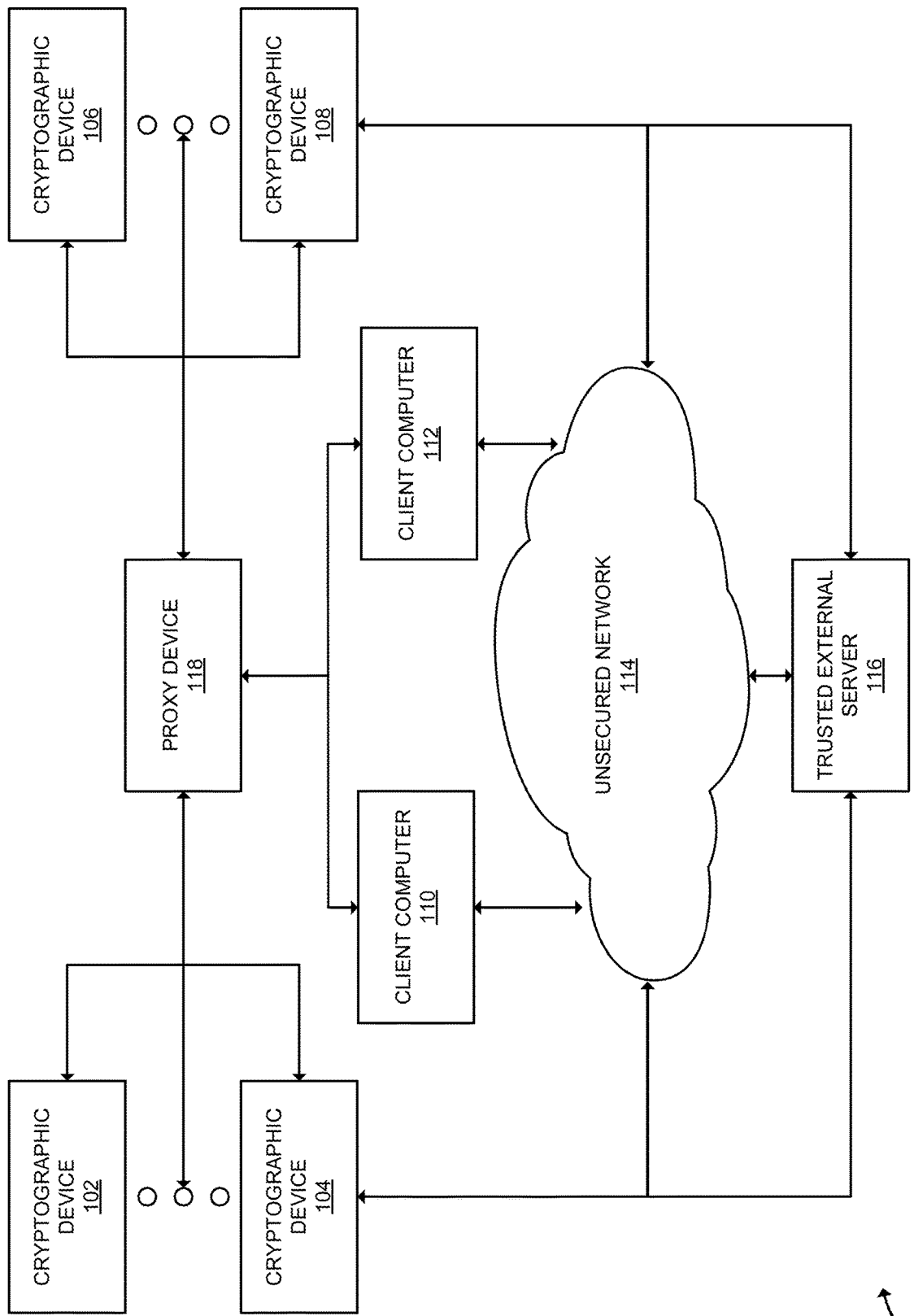
FIG. 1 shows a system block diagram of an exemplary distributed symmetric cryptography system according to some embodiments.

Some embodiments are directed to improvements to distributed symmetric cryptography including both distributed symmetric encryption and distributed symmetric decryption as services. These improvements include the use of multiple distinct secret values and multiple distinct secret shares derived from those secret values. As explained further below, the use of multiple secret shares can make the distributed symmetric cryptographic system resistant to adaptive attack.

Before describing embodiments in more detail, it may be helpful to briefly summarize static, dynamic, and adaptive attacks. In a static attack, an attacker attempts or may succeed in compromising one or more cryptographic devices simultaneously (or nearly simultaneously) at a single instance in time. However, attackers will often make multiple attempts to compromise devices over a period of time.

By contrast, in a dynamic attack, an attacker may attempt or succeed in compromising one or more cryptographic devices over a period of time. An attacker may compromise a single cryptographic device, use the cryptographic device to participate in cryptographic operations, then later compromise another cryptographic device, and so on. An adaptive attack is a variation of a dynamic attack in which the attacker adapts or otherwise modifies their attacking behavior over a period of time. For example, the attacker can use information gathered during cryptographic operations to in order to modify their attacking behavior.

For example, in a distributed cryptography system comprising four cryptographic devices, "A," "B," "C," and "D," an attacker could first attack and compromise cryptographic device "A." Compromised cryptographic device "A" could participate in distributed cryptographic operations (without revealing its compromised nature). At a later time, the attacker could choose to attack either device "B," "C," or "D" based on the results of these cryptographic operations.

Typically, in an adaptive attack, an attacker has more flexibility than in a static attack. This puts an adaptive attacker at a relative advantage when compared to a static attacker. As such, adaptive attacks have a higher probability of successfully breaching distributed symmetric cryptography systems than static attacks. Further, while some distributed symmetric cryptography systems are proven to be secure against static attacks, they are not proven to be secure against dynamic attacks. This potential vulnerability may allow attackers or other malicious entities to acquire and decrypt sensitive encrypted information (e.g., medical records or financial information).

However, as described above, some embodiments perform distributed symmetric cryptography using multiple distinct secret shares stored on the cryptographic devices. The use of multiple secret shares is a security improvement over conventional distributed symmetric cryptosystems, as it protects the distributed symmetric cryptography system from adaptive attack.

In some embodiments, a client computer and a plurality of cryptographic devices in a network of cryptographic devices can work together to encrypt a message or decrypt ciphertext. Not all cryptographic devices in the network of cryptographic devices necessarily need to participate, instead only a threshold number of cryptographic devices need to participate. For example, in a network of ten cryptographic devices, perhaps only seven cryptographic devices may need to participate. This property may be referred to as "t-out-of-n" (e.g., 7-out-of-10) threshold authenticated encryption.

During distributed symmetric encryption, the client computer can generate a first commitment and a second commitment using a first hash function, a second hash function, a message, and optionally a random value. The first commitment may comprise a hash of the message (or the message and the random value) produced using the first hash function. The second commitment may comprise a hash of the message (or the message and the random value) produced using the second hash function. The client computer may select these hash functions from a plurality of hash functions before generating the first and second commitments, e.g., using a random selection process. The client computer can select a plurality of cryptographic devices to participate in the distributed symmetric encryption operation, and can transmit the commitments to these participating cryptographic devices.

Each cryptographic device can store multiple secret shares that are used in distributed symmetric cryptography. Optionally, the cryptographic devices can also store verification shares. In some embodiments, each cryptographic device can store a first secret share and a second secret share. The first secret share can be derived from a first secret value and the second secret share can be derived from a second secret value. Each participating cryptographic device can generate a respective first partial computation using the first commitment and a respective first secret share. Likewise, each participating cryptographic device can generate a respective second partial computation using the second commitment and a respective second secret share. The participating cryptographic devices can each produce a partial computation by combining their respective first partial computations and second partial computations (e.g., by calculating a product of the first partial computation and the second partial computation).

By generating and combining multiple partial computations using multiple independent secret shares, the cryptographic devices protect those secret shares in order to prevent them from being determined by an adaptive attacker. This may not be the case in a distributed cryptographic system in which each cryptographic device possesses only a single secret share. When only a single secret share is used to generate a partial computation, an adaptive attacker may be able to identify correlations from the partial computation because there is exactly one secret that could produce that partial computation. By contrast, when multiple secret shares are used to generate a partial computation, there may be an exponential number of pairs of first secret shares and second secret shares that could produce that same partial computation. As an analogy, the equation $X+2=7$ has only one solution ($X=5$), while the equation $X+Y+2=7$ has an infinite number of solutions for the pair $(X, Y)$ as it is an underdetermined system (i.e., there are less equations than variables in the system). The first equation is analogous to the case where each cryptographic device possesses only a single secret share, while the second equation is analogous to the case where each cryptographic device possesses two secret shares.

Optionally, the cryptographic devices can generate a plurality of partial signatures using the first commitment and/or the second commitment and their respective verification shares. These verification shares may correspond or be derived from a verification value. The partial signatures can be combined by the client computer to produce a verification signature. At a later time (e.g., during a decryption operation), the client computer can provide the verification signature to the cryptographic devices. The cryptographic devices can use the verification signature to verify the legitimacy of the client computer's request.

After generating the plurality of partial computations, the participating cryptographic devices can transmit the plurality of partial computations (and optionally the plurality of partial signatures) to the client computer. The client computer can combine or otherwise use the plurality of partial computations to generate a cryptographic key, and combine the plurality of partial signatures to generate a verification signature. The client computer can use the cryptographic key to encrypt the message to produce a ciphertext, then produce a payload comprising the ciphertext and other information (for example, the first and second commitments, a random value used to generate the first and second commitments, the verification signature, a hash identifier, etc.) A hash identifier may be used to identify the first and second hash functions used to generate the first and second commitment respectively.

The client computer may perform additional steps during the decryption process, such as verifying the partial computations received from the cryptographic devices. The client computer may verify these partial computations using check values corresponding to the secret shares used to generate the partial computations. This verification may be performed using an HVZK proof.

To decrypt the ciphertext, a client computer (which may be the same client computer that encrypted the message or a different client computer) may transmit the first commitment and the second commitment (and optionally the verification signature) to an additional plurality of cryptographic devices. This additional plurality of cryptographic devices may also comprise a threshold number of cryptographic devices. None, some, or all of the additional cryptographic devices may be the same as the plurality of cryptographic devices that participated in encryption. Each cryptographic device of the additional plurality of cryptographic devices may possess a first secret share and a second secret share, a verification share, and a verification key. The verification key may comprise a public key corresponding to a verification value comprising a private key.

Optionally, the additional plurality of cryptographic devices may verify the verification signature using the verification key. If the verification signature is legitimate, the additional plurality of cryptographic devices may generate an additional plurality of partial computations and transmit the additional plurality of partial computations to the client computer. The client computer may use the additional plurality of partial computations to generate a cryptographic key, then use the cryptographic key to decrypt the ciphertext and produce the message. In these ways, the client computer and cryptographic devices may perform distributed symmetric decryption.

Some embodiments are described in more detail below with reference to the figures. Concepts such as secret sharing and distributed pseudorandom functions are described in Section I. An exemplary distributed cryptographic network is described in Section II with reference to FIG. 1. An exemplary client computer is described in Section II with reference to FIG. 2. An exemplary cryptographic device is described in Section II with reference to FIG. 3. Exemplary systems and methods for secret share distribution are described in Section III with reference to FIGS. 4 and 5. Methods of adaptive attack resistant distributed symmetric cryptography are described in Sections IV with reference to FIGS. 6A, 6B, 7A, and 7B. A computer system is described in Section V with reference to FIG. 8.

I. Distributed Symmetric Cryptography Overview

Some embodiments may make use of secret sharing, pseudorandom functions, and distributed pseudorandom functions in order to implement distributed symmetric cryptography. These concepts are described in more detail below.

A. Secret Shares and Verification Shares

As stated above, secret shares may be derived from shared secrets (also referred to as secret values). The secret shares may be used to perform cryptographic operations. For example, secret shares may be used to generate a cryptographic key. Secret shares may be combined in some manner in order to reproduce the shared secret from which those secret shares were derived. Using secret shares may be preferable to using a single secret value in some cryptographic applications, because a malicious user must steal multiple secret shares in order to reproduce and obtain the shared secret. By contrast, in a non-distributed cryptosystem, the malicious user only needs to steal one secret value in order to obtain it.

Verification shares can be similar to secret shares. Verification shares may correspond to a verification value, similar to how secret shares correspond to a secret value. Verification shares may be combined in some manner to reproduce a verification value. In some embodiments, methods used to generate, distribute, or combine verification shares may also be used to generate, distribute or combine verification shares.

Verification shares may be used to produce a verification signature, which may be used to verify distributed symmetric cryptographic operations. As an example, in some embodiments, cryptographic devices verify a verification signature during distributed symmetric decryption. The presence of the verification signature indicates to the cryptographic devices that the client computer is performing a decryption operation.

Secret shares and verification shares may possess some useful optional properties. One such property is the "t-out-of-n" property. This property indicates that t secret shares or verification shares out of a total of n secret shares or verification shares are sufficient to reproduce the secret value or verification value. It may not matter which secret shares are used to reproduce the secret value, only that at least t secret shares are needed.

There are many techniques that can be used to implement secret sharing, particular t-out-of-n secret sharing. Shamir's secret sharing scheme is one non-limiting example discussed below. However, other appropriate secret sharing techniques are equally applicable (e.g., Blakley's scheme, the Chinese Remainder Theorem, etc.).

Generally, Shamir's secret sharing involves encoding a secret value (or alternatively, a verification value) into the coefficients of a polynomial $P(x)=a_0+a_1x+a_2x^2+ \ldots +a_kx^k$. The secret shares or verification shares can comprise distinct points (paired x, P(x) values) on the polynomial. The shared secret or verification value can be obtained from the secret shares or verification shares by interpolating the polynomial using the secret shares or verification shares. Lagrange interpolation is one method that can be used.

A polynomial P(x) of degree k can comprise k+1 coefficients $a_0, a_1, \ldots, a_k$. While the secret value or verification value can be encoded into any coefficient, it is sometimes preferable to encode the secret value or verification value into the zeroth order coefficient $a_0$. The secret value or verification value can be encoded into the zeroth order coefficient $a_0$ by using the secret value or verification value as the coefficient $a_0$ in the polynomial P(x). The value of the other coefficients $a_1, a_2, \ldots, a_k$ may be selected in any appropriate manner (e.g., randomly). If the secret value S is encoded into the zeroth order coefficient $a_0$, the polynomial P(x) evaluated at x=0 is equal to the shared secret i.e., $P(0)=a_0=S$.

Shamir's secret sharing uses the fact that k+1 unique points are needed to uniquely define a polynomial P(x) of degree k. Once P(x) is uniquely defined, P(x) can be evaluated at a particular value of x (e.g., x=0) in order to determine the secret value. Thus k+1 is the minimum or threshold number of points t needed to interpolate the polynomial and determine the secret value or verification value. When secret shares are distributed to a plurality of cryptographic devices, at least a threshold number t of those cryptographic devices must participate in order to reach the threshold number of secret shares.

Further, because the secret values (or verification shares) comprise points on a polynomial (of which there are infinite), Shamir's secret sharing can provide for an arbitrarily large number of secret shares for any given threshold. This means that networks of cryptographic devices can possess an arbitrarily large number of cryptographic devices for any given threshold.

As stated above, in some embodiments, cryptographic devices may possess a first secret share and a second secret share, derived from a first secret value and a second secret value respectively. This could be accomplished by encoding the first secret value into a first polynomial $P_1(x)$ and the second secret value into a second polynomial $P_2(x)$ (as described above), then sampling $P_1(x)$ to produce a point comprising the first secret share and sampling $P_2(x)$ to produce a point comprising the second secret share. The polynomials can be sampled at any value of x, other than x=0, and provided that no two cryptographic devices receive secret shares corresponding to the same value of x.

One technique that can be used is using unique serial numbers or device identifier corresponding to particular cryptographic devices as values of x. A cryptographic device with serial number "18723" may receive a secret share (x, P(x)) comprising (18723, P(18723)), while a cryptographic device with a serial number "99123" may receive a secret share comprising (99123, P(99123)). Because the serial numbers or device identifiers are unique, two cryptographic devices are guaranteed to possess different secret shares.

B. Lagrange Interpolation

An example of Lagrange interpolation is now discussed. A polynomial P(x), and consequently a secret value (or verification value) S can be determined using Lagrange interpolation, which can be used to relate secret shares or verification shares comprising paired $(x_j, P(x_j))$ values to the polynomial P(x). The pair $(x_j, P(x_j))$ corresponds to the $j^{th}$ secret share. The Lagrange form of a polynomial is given by the following formula:

$$P(x)=\Sigma_{j=0}^{k}P(x_j)l_j(x) \quad (1)$$

Where $l_j(x)$ is the $j^{th}$ Lagrange basis polynomial (i.e., corresponding to the $j^{th}$ secret share). The Lagrange basis polynomial $l_j(x)$ is defined by the following formula:

$$l_j(x) = \prod_{\substack{0 \leq p \leq k \\ p \neq j}} \frac{x-x_p}{x_j-x_p} \quad (2)$$

Where $x_j$ is the x value corresponding to the $j^{th}$ secret share (or verification value) and $x_p$ is the x value of the $p^{th}$ secret share (or verification value).

Because P(0) equals the zeroth order coefficient $a_0$, if the secret value or verification value S is encoded into $a_0$, the preceding formulas can be simplified by substituting x=0:

$$l_j \approx \prod_{\substack{0 \le p \le k \\ p \ne j}} \frac{-x_p}{x_j - x_p} \quad (3)$$

$$S = a_0 = \sum_{j=0}^{k} P(x_j) l_j \quad (4)$$

Shamir's secret sharing can be used to distribute secret shares or verification values to a number of cryptographic devices. These secret shares or verification shares may comprise unique points given as paired values $(x_j, P(x_j))$. Using a threshold number of these secret shares or verification values, the Lagrange coefficients can be calculated and used along with the values $P(x_j)$ to determine the secret value (or verification value) S, as shown above.

Notably, the Lagrange coefficients $l_j$ are dependent only on the values of x corresponding to the cryptographic devices. As stated above, these values of x may comprise unique serial numbers or identification numbers corresponding to each cryptographic device, and thus may be known in advance of the generation of any polynomials. Thus the Lagrange coefficients $l_j$ corresponding to each cryptographic device can be pre-calculated.

Further, because the Lagrange coefficients are independent of any polynomial P(x), a single Lagrange coefficient can be used for multiple distinct polynomials $P_1(x)$ and $P_2(x)$. As a result, a single Lagrange coefficient can correspond to a cryptographic device possessing any number of secret shares derived from any number of distinct secret values.

Using Shamir's secret sharing, a secret value or verification value can be reconstructed regardless of which secret shares or verification shares are used. Thus different cryptographic devices can participate in the distributed cryptographic operation each time and still produce the same shared secret or verification value. However, it is sometimes preferable to produce a value derived from either the shared secret or verification value, rather than the secret value or verification value itself, in order to protect or obscure the secret value or verification value. This can be accomplished using distributed pseudorandom functions, as described below.

C. Pseudorandom and Distributed Pseudorandom Functions

A pseudorandom function is a function that produces an output where the relationship between the input and the output appears random. The advantage of using pseudorandom functions is that it is difficult to determine the input given the output, and thus pseudorandom functions can be used to obscure inputs.

In a hypothetical cryptographic application, a secret value S could comprise a cryptographic key. The secret value S could be used to encrypt or decrypt data, when and if it is reconstructed from its constituent secret shares $s_0, s_1, \ldots, s_r$. However, this may be undesirable, because after the shared secret is reconstructed, the shared secret could be stolen and used by a malicious participant (e.g., a malicious client computer or malicious cryptographic device). Instead, it may be preferable to use the shared secret as an input to a pseudorandom function, then use the output of the pseudorandom function to generate a cryptographic key. In this way the secret value S is not exposed to an attacker or other malicious user.

A distributed pseudorandom function may refer to a pseudorandom function that can be calculated in a distributed manner. As an example, a plurality of cryptographic devices may calculate a plurality of partial computations. These partial computations may be combined to produce the output of a pseudorandom function. The combination of those partial combinations may be equivalent to the output of a corresponding non-distributed pseudorandom function (e.g., one where a single cryptographic device directly produces the output of a pseudorandom function).

Any pseudorandom function that appears random and is consistent can be used as the basis for a distributed pseudorandom function. Notable examples of pseudorandom functions are hash functions, the advanced encryption standard (AES) cryptosystem and elliptic curve cryptosystems. Elliptic curve cryptography will be described below for the purpose of illustrating some embodiments, however, it should be understood that embodiments can be practiced with any appropriate pseudorandom function.

An elliptic curve is any curve satisfying the equation $y^2=x^3+ax+b$. Elliptic curve cryptography is usually performed using elliptic curves over finite fields. An example of a finite field is integers mod p, where p is a prime number. Integers mod p comprises every integer from 0 to p−1. An elliptic curve group may be defined by its order q, the number of elements within the group. The decisional Diffie-Hellman assumption holds under these elliptic curve groups.

Elliptic curve cryptosystems, like many other cryptosystems, relies on mathematical problems which have computationally infeasible solutions. With elliptic curve cryptography, there is currently no efficient solution to the "elliptic curve discrete logarithm problem." Given an original point A on an elliptic curve and a product point C on an elliptic curve, it is sufficiently difficult to determine a multiplicand point B, such that the point multiplication A*B=C holds. A practical result is that as long as B is kept secret, a message can be converted into a point A and point-multiplied with a point B in order to produce a product point C.

The decisional Diffie-Hellman assumption states that in a multiplicative group G of prime order p with generator g, that for random and independent a and b, the values $g^a$, $g^b$ and $g^{ab}$ all appear to be random elements selected from the group G. In other words, it is difficult to determine the multiplicative relationship between $g^a$, $g^b$ and $g^{ab}$ (i.e., that $g^{ab}$ equals the product of $g^a$ and $g^b$).

Practically, two points on an elliptic curve can be multiplied to produce a third point, and the relationship between the two points and the third point appears random. So if some value can be represented as a point, that value can be point multiplied by another value to produce a third value, and the relationship between those three values appears random. Thus elliptic curves can be used as a pseudorandom functional basis for distributed pseudorandom functions.

D. Applications

In some embodiments, elliptic curve cryptography can be used to encrypt a first commitment $H_1(m)$ and a second commitment $H_2(m)$ (i.e., hash values corresponding to an input message m) using a plurality of secret shares. These encrypted commitments may be referred to as partial computations. As shown below, the partial computations can be combined to produce one value that is equivalent to the first commitment $H_1(m)$ encrypted using a first secret value $S_1$, and a second value that is equivalent to the second commitment $H_2(m)$ encrypted using a second secret value $S_2$, demonstrating that elliptic curve cryptography can be used as a distributed pseudorandom function.

The term $H_n(m)^{S_n}$ may be used to represent the $n^{th}$ commitment $H_n(m)$ encrypted using the $n^{th}$ secret value $S_n$ using elliptic curve cryptography (e.g., the first commitment encrypted using the first secret value or the second commitment encrypted using the second secret value). The term $H_n(m)^{s_{n,i}}$ may be used to represent the partial computation comprising the $n^{th}$ commitment $H_n(m)$ encrypted using the $i^{th}$ secret share corresponding to the $n^{th}$ commitment $s_{n,i}$. In elliptic curve cryptography, $H_n(m)^{S_n}$ is equivalent to point multiplying the $n^{th}$ commitment $H_n(m)$ by itself $S_n$ times, and the partial computation $H_n(m)^{s_{n,i}}$ is equivalent to point multiplying the $n^{th}$ commitment $H_n(m)$ by itself $s_{n,i}$ times.

The relationship between $H(m)^{S_n}$ and $H_n(m)^{s_{n,i}}$ can be shown using formula (4):

$$H_n(m)^{s_n} = H_n(m)^{\Sigma_{i=1}^{t} s_{n,i} \lambda_i} = \Pi_{i=1}^{t}(H_n(m)^{s_{n,i}})^{\lambda_i} \quad (5)$$

Where $s_{n,i}$ is the $i^{th}$ secret share corresponding to the $n^{th}$ secret value and $\lambda_i$ is the $i^{th}$ Lagrange coefficient corresponding to the $i^{th}$ cryptographic device (see formula (3)). Thus, the $n^{th}$ commitment encrypted using the $n^{th}$ secret value $S_n$ (i.e., $H_n(m)^{S_n}$ is equal to the product of the $n^{th}$ commitment encrypted using the secret shares and exponentiated using the Lagrange coefficients $(H_n(m)^{s_{n,i}})^{\lambda_i}$. This illustrates one way in which Shamir's secret sharing and elliptic curve cryptography can be used together to implement distributed pseudorandom functionality.

Further, because one set of Lagrange coefficients can be used for any number of polynomials, partial computations corresponding to different commitments and secret shares can be combined prior to calculating the distributed pseudorandom function. For example, a first partial computation and a second partial computation can be combined by calculating the product of the two partial computations:

$$H_1(m)^{s_{1,i}} * H_2(m)^{s_{2,i}} \quad (6)$$

Where $H_1(m)^{s_{1,i}}$ is the first commitment encrypted using the first secret share corresponding to the $i^{th}$ cryptographic device, and $H_2(m)^{s_{2,i}}$ is the second commitment encrypted using the second secret share corresponding to the $i^{th}$ cryptographic device.

Substituting this combination for the partial computation $H_n(m)^{s_{n,i}}$ in equation (5) produces:

$$\Pi_{i=1}^{t}(H_1(m)^{s_{1,i}} * H_2(m)^{s_{2,i}})^{\lambda_i} = \Pi_{i=1}^{t} H_1(m)^{\lambda_i s_{1,i}} * H_2(m)^{\lambda_i s_{2,i}}$$

$$\Pi_{i=1}^{t} H_1(m)^{\lambda_i s_{1,i}} * H_2(m)^{\lambda_i s_{2,i}} = \Pi_{i=1}^{t} H_1(m)^{\lambda_i s_{1,i}} * \Pi_{i=1}^{t} H_2(m)^{\lambda_i s_{2,i}}$$

$$\Pi_{i=1}^{t} H_1(m)^{\lambda_i s_{1,i}} * \Pi_{i=1}^{t} H_2(m)^{\lambda_i s_{2,i}} = H_1(m)^{S_1} * H_2(m)^{S_2}$$

Thus the output of the distributed pseudorandom function with multiplied partial combination inputs (e.g., as in equation (6)) is equivalent to the product of the partial combination outputs. Further, the first secret value $S_1$ and the second secret value $S_2$ are obscured by this product. Knowing the value of the first commitment $H_i(m)$, the second commitment $H_2(m)$, and the product $H_1(m)^{S_1} * H_2(m)^{S_2}$ is not sufficient to determine the first secret value $S_1$ or the second secret value $S_2$, as there are an infinite number of $S_1$, $S_2$ pairs that could produce the product given the first commitment and the second commitment. In this way the secret values and secret shares are protected even from adaptive attackers.

In some embodiments, a client computer can use the output of the distributed pseudorandom function to generate a cryptographic key that can be used for encryption and decryption. Provided consistent commitments are used for encryption and decryption, the same cryptographic key can be generated and used for encrypting messages and decrypting corresponding ciphertext.

To summarize in context of some embodiments, each cryptographic device can possess two secret shares $s_{1,i}$ and $s_{2,i}$ corresponding to two distinct secret values. A threshold number of cryptographic devices can participate in a multi-party cryptographic operation. A client computer may possess a message m that the client computer wants to encrypt. The client computer may generate two commitments of the message using two distinct hash function $H_1(m)$ and $H_2(m)$, and transmit the commitments to the participating cryptographic devices. The participating cryptographic devices may each use their corresponding secret shares $s_{1,i}$ and $s_{2,i}$ to encrypt the commitments $H_1(m)$ and $H_2(m)$, each cryptographic device producing a first partial computation $H_1(m)^{s_{1,i}}$ and a second partial computation $H_2(m)^{s_{2,i}}$ in the process. The cryptographic devices may combine their respective first and second partial computations (e.g., by calculating the product $H_1(m)^{s_{1,i}} * H_2(m)^{s_{2,i}}$) to produce a respective partial computation.

Subsequently, the participating cryptographic devices may transmit the plurality of partial computations $H_1(m)^{s_{1,i}} * H_2(m)^{s_{2,i}}$ to the client computer. The client computer may determine Lagrange coefficients corresponding to the plurality of partial computations $H_1(m)^{s_{1,i}} * H_2(m)^{s_{2,i}}$. The client computer may exponentiate the plurality of partial computations with their corresponding Lagrange coefficients $\lambda_i$ to produce a plurality of intermediate computations. The client computer may combine the intermediate computations by calculating their product. The product of the intermediate calculations may be equivalent to the products of the first commitment $H_1(m)$ and the second commitment $H_2(m)$ encrypted using the first secret value and the second secret value respectively (i.e., $H_1(m)^{S_1} * H_2(m)^{S_2}$). The product of the intermediate calculations may be used as a key generation seed in order to generate a cryptographic key. The cryptographic key may be used to encrypt the client computer's message and produce a ciphertext. When the ciphertext is to be decrypted, the same process may occur and the same cryptographic key may result. The ciphertext may be decrypted with the cryptographic key, generating the message m.

In some embodiments, verification signatures can be produced using similar methods. A client computer may transmit a commitment $H_n(m)$ (or multiple commitments) of a message m to a plurality of cryptographic devices. The plurality of cryptographic devices may use elliptic curve cryptography to encrypt the commitment $H_n(m)$ using each of their respective verification shares to produce a plurality of partial signatures. The plurality of cryptographic devices may transmit the plurality of partial signatures to the client computer. The client computer may determine a plurality of Lagrange coefficients $\lambda_i$ corresponding to the plurality of partial signatures, then exponentiate each partial signature using its corresponding Lagrange coefficient to produce a plurality of intermediate signatures. The client computer may generate a verification signature as the product of the plurality of intermediate signatures. The verification signature may be equivalent to the commitment $H_n(m)$ encrypted using the verification value. In some embodiments, partial signatures may be produced with only a single commitment, such as the first commitment or the second commitment. In others, partial signatures may be produced using both a first commitment and a second commitment, analogous to the generation of partial computations described above.

The verification value and a verification key may comprise an asymmetric cryptographic key pair. That is, the verification value may comprise a secret or private cryptographic key, and the verification key may comprise a public cryptographic key, or vis versa. To verify a verification signature, a cryptographic device may decrypt the verification signature using the verification key to produce the first commitment, the second commitment, or a combination thereof. If the resulting commitment matches a commitment received from the client computer, the verification signature is legitimate.

The preceding example was intended as one non-limiting example of how shared secrets and distributed pseudorandom function may be used to perform distributed symmetric cryptography according to some embodiments. Embodiments may use any appropriate pseudorandom function (such as AES, hash functions, etc.) as well as any appropriate secret sharing techniques (e.g., Blakley's scheme, the Chinese Remainder Theorem, etc.).

II. Distributed Cryptographic Network

A. System Block Diagram

FIG. 1 shows a system block diagram of an exemplary distributed cryptography network 100 according to some embodiments. The exemplary distributed cryptography network may comprise cryptographic devices 102-108, client computers 110 and 112, unsecured network 114, trusted external server 116, and optionally proxy device 118.

Although only four cryptographic devices 102-108 are shown, embodiments can be practiced with any number of cryptographic devices. Likewise, although only two client computers 110 and 112 are shown, embodiments can be practiced with any number of client computers.

The computers and devices of FIG. 1 may communicated with each other via a communication network, which can take any suitable form, and may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers and devices may be transmitted using a secure communications protocol, such as, but not limited to, File Transfer Protocol (FTP); HyperText Transfer Protocol (HTTP); Secure HyperText Transfer Protocol (HTTPS); Secure Socket Layer (SSL), ISO (e.g., ISO 8583) and/or the like.

The distributed cryptography network may enable client computers 110 and 112 to encrypt messages or decrypt ciphertext using cryptographic materials (secret shares) securely stored by cryptographic devices 102-108. Client computers 110 and 112 may communicate with cryptographic devices 102-108 either directly, via a network (such as the Internet or unsecured network 114) or via an optional proxy device 118. The client computers 110-112 may possess messages to be encrypted ("plaintext messages" or "plaintext") or decrypted ("ciphertext messages" or "ciphertext"), as well as hardware, software, code, or instructions that enable client computers 110-112 to participate in distributed symmetric cryptographic processes.

Each cryptographic device 102-108 may possess multiple secret shares (e.g., a first secret share and a second secret share) and may optionally possess a verification share. The secret shares and verification shares may be derived from multiple secret values (e.g., a first secret value and a second secret value) and a verification value. The secret values and verification value may be shared among the cryptographic devices 102-108, e.g., secret shares and verification shares may be derived from the secret values and the verification value. The verification value may correspond to a verification key that can be used by cryptographic devices 102-108 to verify verification signatures produced using verification shares. A threshold number of secret shares may allow the reconstruction of a secret value, and a threshold number of the verification shares may allow the reconstruction of the verification value. The threshold number may be less than the total number of cryptographic devices 102-108. For example, if there are twenty cryptographic devices 102-108, the threshold number may be 14 cryptographic devices, or any other appropriate number of cryptographic devices.

The cryptographic devices 102-108 may be organized into a cryptographic device network. This cryptographic device network may comprise a local area network connected to a larger computer network, such as the Internet or unsecured network 114. Communications between the cryptographic device network and external computers (e.g., client computers 110 and 112) may be mediated by the proxy device 118, which may comprise a web server that communicates with client computers 110 and 112 via any appropriate means (e.g., an Application Programming Interface API).

A cryptographic device network may be organized into any appropriate networking structure. For example, a cryptographic device network may comprise a "chain" structure, whereby the cryptographic devices are organized into a linear sequence of cryptographic devices. Communications from a client computer 110 to one cryptographic device (e.g., cryptographic device 108) may pass through all the preceding cryptographic devices (e.g., cryptographic device 102-106) and proxy device 118 before reaching the intended recipient (e.g., cryptographic device 108). Alternatively, the cryptographic device network may comprise a "tree" structure, with different branches comprising different collections of cryptographic devices (e.g., one branch may comprise cryptographic devices 102 and 104, and another branch may comprise cryptographic devices 106 and 108). A cryptographic device network may comprise any number of proxy devices 118, which may act as proxies to cryptographic devices or other proxy devices 118.

Unsecured network 114 may comprise a computer network over which client computers 110 and 112 communicate with one another. Unsecured network 114 may comprise a network such as the Internet. A client computer such as client computer 110 may communicate with cryptographic devices 102-108 in order to encrypt a message, such that the encrypted message can be securely transmitted to client computer 112 via unsecured network 114. Client computer 112 can then communicate with cryptographic devices 102-108 in order to decrypt the message.

As an example, client computers 110 and 112 may comprise medical record systems in different hospitals. These hospitals may not be equipped to encrypt medical records on their own. As such, in order to comply with patient confidentiality rules, these hospitals may use their respective client computers 110 or 112 and cryptographic devices 102-108 to encrypt medical records before storing them in a medical record database. When a medical record needs to be decrypted (i.e., prior to a meeting between a doctor and the patient corresponding to that medical record), client computer 110 or 112 can communicate with cryptographic devices 102-108 in order to decrypt the medical record. As another example, if a patient is being transferred from the first hospital to the second hospital, the client computer corresponding to the first hospital (e.g., client computer 110)

can transmit the encrypted medical record to the client computer corresponding to the second hospital (e.g., client computer 112). The client computer corresponding to the second hospital can decrypt the medical record using by communicating with cryptographic devices 102-108, or a different set of cryptographic devices that are provisioned using the same master key.

Trusted external server 116 may provide or otherwise provision secret shares and verification shares to cryptographic devices 102-108. The trusted external server 116 may additionally publish check values, which may be used by client computers 110 and 112 to verify partial computations received from any of cryptographic devices 102-108. Trusted external server 116 may communicate with cryptographic devices 102-108 directly, via proxy device 118 or via unsecured network 114. Likewise, client computers 110 and 112 may retrieve the published check values from trusted external server 116 either directly, via proxy device 118, or via unsecured network 114.

B. Use of Multiple Secrets

As stated above, some embodiments use multiple secret values (e.g., shared secrets) and multiple secret shares in order to safeguard the distributed symmetric cryptosystem from adaptive attacks. Each cryptographic device (e.g., cryptographic devices 102-108 in FIG. 1) can possess multiple secret shares. For example, a cryptographic device i, can possess two secret shares: $s_{1,i}$ and $s_{2,i}$, derived from independently sampled secret values $S_1$ and $S_2$ respectively.

The cryptographic devices can use these secret shares, along with commitments provided by client computers to generate partial computations. These partial computations can be generated as part of a distributed pseudorandom function. As described above in Section I, a distributed pseudorandom function may comprise a function that can be calculated in a distributed manner and produces outputs that appear random. Some cryptosystems, such as elliptic curve cryptography are examples of pseudorandom functions. The function is distributed because the partial computations generated by each cryptographic device can be combined to produce a single output.

For example, a client computer may transmit a first commitment $h_1$ and a second commitment $h_2$ to a plurality of cryptographic devices. Each cryptographic device may generate two partial computations $y_{1,i}$ and $y_{2,i}$ using these commitments and their respective secret shares $s_{1,i}$ and $s_{2,i}$, where $y_{n,i}$ is the $n^{th}$ partial computation corresponding to the $i^{th}$ cryptographic device. The cryptographic devices may use a DPRF.Eval function to generate these partial computations. In some embodiments, the partial computations may be generated by encrypting each of the commitments using the respective secret share using elliptic curve cryptography. Mathematically, this can be represented as $y_{n,i}=h_n^{s_{n,i}}$.

Each cryptographic device can then combine the partial computations it generated to produce a single partial computation. For example, if cryptographic device i generated two partial computations $y_{1,i}=h_1^{s_{1,i}}$ and $y_{2,i}=h_2^{s_{2,i}}$, it can combine those two partial computations to produce a single partial computation $y_i$. The cryptographic devices may use a DPRF.Combine function for this purpose. In some embodiments, combining the partial computations may comprise calculating a product of the partial computations, i.e., $y_i = y_{1,i}*y_{2,i}=h_1^{s_{1,i}}*h_2^{s_{2,i}}$.

Each cryptographic device can send its combined partial computation to the client computer, which can subsequently combine all those partial computations and use the result to generate a cryptographic key. Further, the secret shares $s_{n,i}$ are hidden by the combination of partial computations performed by the cryptographic devices, preventing a malicious client computer or an eavesdropper from determining the secret shares used to generate those partial computations.

After receiving the partial computations, the client computer can generate the cryptographic key or a cryptographic key seed by combining the partial computations $y_i$ using its own DPRF. Combine function. The DPRF.Combine function used by the client computer may be different from the DPRF.Combine function used by the cryptographic devices. The client computer may combine the partial computations by first exponentiating each partial computation with its corresponding Lagrange coefficient $\lambda_i$, i.e., $y_i^{\lambda_i}=(h_1^{s_{1,i}}* h_2^{s_{2,i}})^{\lambda_i}$. The term $y_i^{\lambda_i}$ may be referred to as an intermediate computation. The client computer may have previously received these Lagrange coefficients from a trusted external server (e.g., trusted external server 116 from FIG. 1) The client computer may then combine the intermediate computations by calculating the product: $y=\Pi_i y_i^{\lambda_i}=\Pi_i=\Pi_i (h_1^{s_{1,i}}*h_2^{s_{2,i}})^{\lambda_i}$. The resulting value y may be used either as the cryptographic key or as a seed for a cryptographic key generating algorithm. The algorithm may in turn be used to generate the cryptographic key.

C. Client Computer

As described above, a client computer may comprise a computer system that communicates with a distributed symmetric cryptography system (e.g., a cryptographic device network) in order to encrypt messages or decrypt ciphertext. A client computer may comprise a personal computer or a communication device associated with a user. These devices may include, for example, laptops, desktop computers, smartphones, tablets, smart watches, PDAs, etc. A client computer may also comprise a server computer or mainframe computer associated with an organization (e.g., a business).

Figure 2:
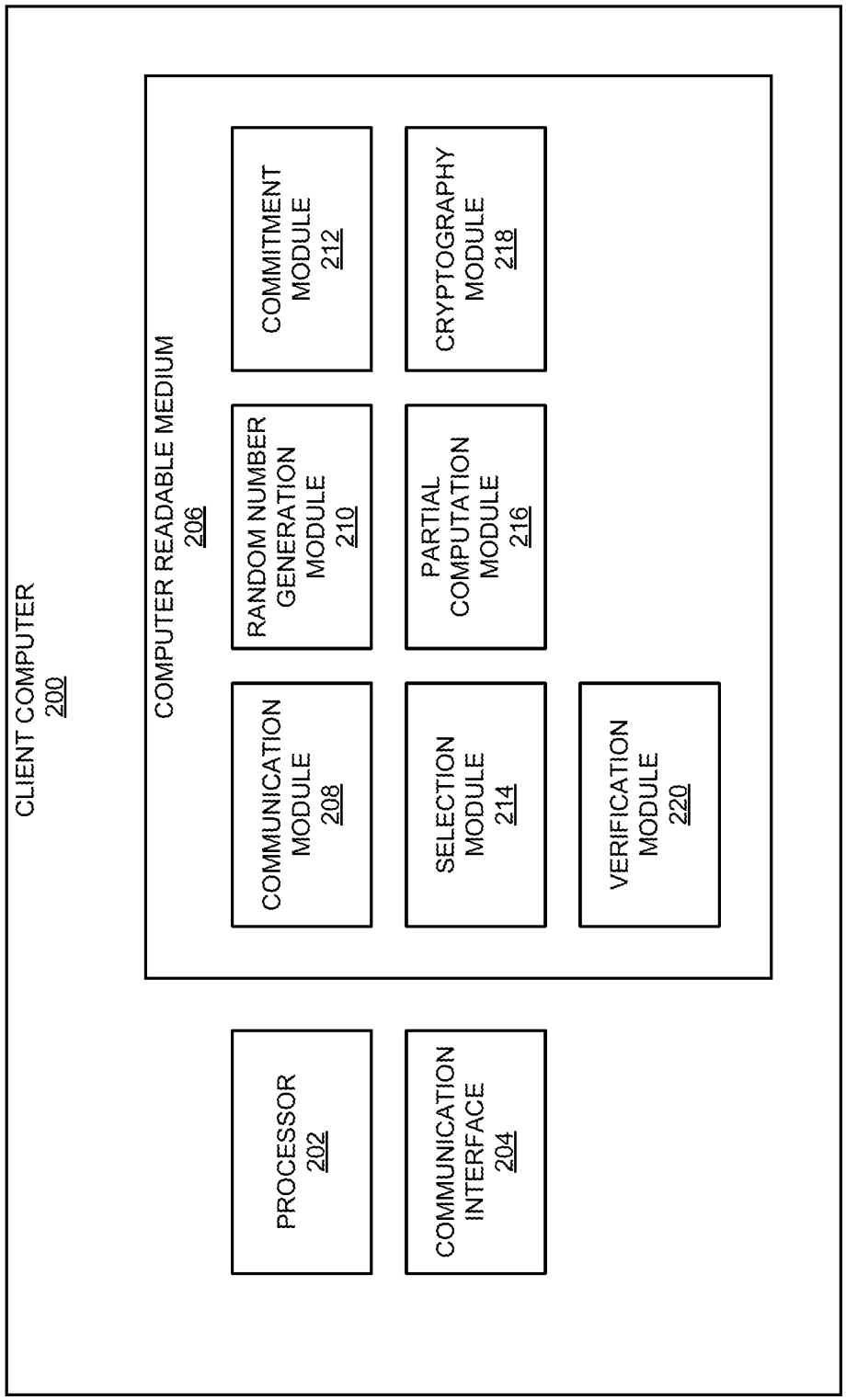
FIG. 2 shows a system block diagram of an exemplary client computer according to some embodiments.

FIG. 2 shows an exemplary client computer 200. Client computer 200 may comprise a processor 202, a communication interface 204, and a computer readable medium 206.

1. Processing, Communicating, and Storing

Processor 202 may comprise any suitable data computation device or devices. Processor 202 may be able to interpret code and carry out instructions stored on computer readable medium 206. Processor 202 may comprise a central processing unit (CPU) operating on a reduced instructional set, and may comprise a single or multi-core processor. Processor 202 may include an arithmetic logic unit (ALU) and a cache memory, these components may be used by processor 202 in executing code or other functions.

Communication interface 204 may comprise any interface by which client computer 200 may communicate with other computers or devices. Examples of communication interfaces include wired interfaces, such as USB, Ethernet, or FireWire. Examples also include interfaces used for wireless communication, such as a Bluetooth or Wi-Fi receiver. Client computer 200 may possess multiple communication interfaces 204. As an example, a client computer 200 comprising a smartphone may communicate through a micro USB port, a cellular receiver, a Bluetooth receiver, and a Wi-Fi receiver.

Client computer 200 may communicate with other devices or computers, using communication interface 204 via one or more secure and authenticated point-to-point channels. These channels may use standard public-key infrastructure. For example, client computer 200 and a cryptographic device may exchange a symmetric key and/or key shares via their communication interfaces. This key exchange may comprise a Diffie-Hellman key exchange. After exchanging cryptographic keys, client computer 200 and the cryptographic devices may communicate over a public channel (such as an unsecured network) using a standard authenticated encryption scheme to encrypt any message with the cryptographic key. Further authentication methods can also be used, e.g., digital signatures.

Computer readable medium 206 may comprise hardware that may possess code, data, or instructions that can be interpreted by processor 202. Computer readable medium 206 may store or otherwise comprise a number of software modules, including a communication module 208, a random number generation module 210, a commitment module 212, a selection module 214, a partial computation module 216, a cryptography module 218, and a verification module 220.

2. Communication Module

Communication module 208 may comprise or include code, instructions, routines, subroutines, etc., that may be used by processor 202 in order to enable the client computer 200 to communicate with other computers or devices, including other client computers, cryptographic devices, and trusted external servers, using any appropriate communications protocol. Communication module 208 may comprise code or instructions, executable by the processor 202 for sending, receiving, formatting, and interpreting requests, messages, payloads and other data.

For example, communication module 208 may comprise code enabling the client computer 200 to transmit requests for cryptographic services (e.g., encryption or decryption) to a plurality of client computers. These requests may include commitments, including a first commitment and a second commitment, verification signatures, random values, etc.

As another example, communication module 208 may comprise code enabling the client computer 200 to format a payload comprising a ciphertext, a first commitment, a second commitment, and optionally a random value, a verification signature, and a hash indicator. Additionally, communication module 208 may comprise code enabling the client computer 200 to transmit the payload to another client computer or other recipient. Likewise, communication module 208 may comprise code enabling the client computer 200 to receive a payload comprising a ciphertext, a first commitment, a second commitment, and optionally a random value, a verification signature, and a hash indicator. Additionally, communication module 208 may comprise code enabling the client computer 200 to interpret the elements of a message, request, or payload (e.g., determine which element in the payload is the ciphertext, which element is the first commitment, etc.).

3. Random Number Generation Module

Random number generation module 210 may comprise or include code, instructions, routines, subroutines, etc., that may be used by processor 202 to generate random or pseudorandom numbers. These random number may include cryptographically secure pseudorandom numbers, and the code may comprise one or more pseudorandom number generation algorithms that meet the requirements for cryptographic security. These requirements, may include, for example, passing the "next bit test" and passing a "state compromise extension test." Examples of cryptographically secure random number generators include the Yarrow, Cha-Cha20, and Fortuna algorithms, among others.

Random number generation module 210 may communicate with other modules or hardware in client computer 200 for the purpose of generating random or pseudorandom numbers. As an example, random number generation module 210 may retrieve the system time (e.g., current year, month, day hour, etc.) in order to seed a pseudorandom number generation algorithm.

Random or pseudorandom numbers may be used to "blind" (i.e., obscure) messages for the purpose of encryption or generating commitments. A message may be combined in some manner with a random or pseudorandom number in order to obscure the message. As an example, a message "hello" may be concatenated with a random number 12345 to produce the blinded message "hello12345." Alternatively, the bitwise exclusive-OR function (XOR) may be used to blind a message using a random number. By blinding messages with random numbers, client computer 200 may protect itself against some cryptographic attacks, including replay attacks. Accordingly, rather than generating a first commitment or second commitment $H(m)$ based solely on a message m, client computer 200 may generate a commitment based on a message and a random value (e.g., $H(m|r)$). Additionally, instead of encrypting a message m, client computer 200 may encrypt the message m and the random value r.

4. Commitment Module

Commitment module 212 may comprise code or instructions used by processor 202 for selecting hash functions, generating commitments (e.g., a first commitment and a second commitment) using hash functions, and identifying or determining hash functions based on hash indicators.

Commitment module 212 may comprise a list or repository of different hash functions (e.g., SHA-256, SHA3, BLAKE2, etc.) that can be used to generate commitments. Commitment module 212 may comprise code enabling the processor 202 to select any number of hash functions (e.g., two) from this list or repository. In some embodiments, commitment module 212 may comprise code enabling the random selection of hash functions. In others, commitment module 212 may comprise code enabling selection of hash functions according to any appropriate criteria (e.g., based on user preference, security score, etc.)

Commitment module 212 may comprise code enabling the processor to execute the selected hash functions using messages and random values as inputs. The resulting hash values may be used by the client computer as commitments. The commitment module 212 may additionally comprise code enabling the client computer 200 to verify the correctness of a decrypted message using the commitments. If commitments produced using decrypted ciphertext match commitments produced using the corresponding plaintext, the client computer can determine that a message was not modified during encryption.

Further, commitment module 212 may comprise code enabling the processor 202 to identify or determine hash functions based on hash indicators. Hash indicators may comprise identifiers that uniquely identify a particular hash function. For example, the name of a hash function (e.g., "BLAKE2") may be used to identify the corresponding hash function. The client computer 200 may use commitment module 212 to identify the hash functions used to generate one or more commitments generated using a plaintext message in order to later verify those commitments using decrypted ciphertext.

5. Selection Module

Optional selection module 214 may comprise code or instructions used by processor 202 for selecting a threshold number of cryptographic devices from cryptographic devices in the cryptographic device network. The threshold number of cryptographic devices may comprise the number of cryptographic devices necessary to reproduce secret values and/or a verification value from secret shares and verification shares stored on those cryptographic devices. In some embodiments, client computer 200 may not select cryptographic devices from cryptographic devices in the cryptographic device network. Instead, client computer 200 may communicate with a proxy device and the proxy device may perform the selection process. Alternatively, the participating cryptographic devices may be pre-selected or static and the client computer 200 may not need to select the participating cryptographic devices. As such, selection module 214 may be optional.

As an example, selection module 214 may comprise code implementing a random selection algorithm. The selection module 214 could include a list of cryptographic devices in the cryptographic device network. The selection module 214 could select, without replacement, from the list until a threshold number of cryptographic devices are selected. Alternatively, selection module 214 may comprise code that enables rule-based cryptographic device selection. For example, the selection module 214 may determine a threat score associated with each cryptographic device. The threat scores may correspond to a likelihood that a given cryptographic device has been compromised by a hacker or malicious user. The selection module 214 may select a threshold number of cryptographic devices with the lowest threat scores, or randomly select from cryptographic devices with a threat score under a certain value.

As another alternative, the selection module 214 may comprise code enabling the selection of cryptographic devices based on computational load. Some cryptographic devices in the cryptographic device network may already be performing distributed symmetric cryptography on behalf of other client computers, and as a result, may have a higher computational load. The client computer 200 may use selection module 214 in order to select a threshold number of cryptographic devices with a lower computational load in order to improve the throughput of the distributed symmetric cryptography system.

6. Partial Computation Module

Partial computation module 216 may comprise code or instructions that enable processor 202 to manipulate or process partial computations and intermediate computations in order to perform distributed symmetric cryptography. This may include generating intermediate computations based on partial computations and combining partial computations to generate a cryptographic key or a key generation seed. Additionally, partial computation module 216 may comprise code enabling processor 202 to generate verification signatures based on partial signatures.

Partial computation module 216 may comprise code enabling the combination of partial computations and partial signatures using any appropriate methods, functions, or algorithms. As on example, partial computations may be combined by calculating the sum or product (or any other combination) of the partial computations. Partial computation module 216 may also comprise code enabling polynomial interpolation, such as the calculation of Lagrange coefficients. These Lagrange coefficients may correspond to partial computations. Additionally, partial computation module 216 may comprise code enabling exponentiation and modular exponentiation. For example, client computer 200 may use partial computation module 216 to calculate a plurality of Lagrange coefficients corresponding to a plurality of partial computations. Client computer 200 may then use partial computation module 216 to exponentiate those partial computations using the plurality of Lagrange coefficients in order to generate a plurality of intermediate computations. For example, partial computation module 216 may be used to calculate intermediate computations $y_i^{\lambda_i}$ using Lagrange coefficient $\lambda_i$ and partial computation $y_i$.

Subsequently, client computer 200 may combine the partial computations by calculating the product of those intermediate computations y, i.e., $y=\Pi_i y_i^{\lambda_i}$. The product of the intermediate computations y may be used as a cryptographic key, or as a key generation seed. Client computer 200 can use the cryptography module 218 to input this key generation seed into a key generation algorithm in order to produce a cryptographic key that can be used to encrypt or decrypt a message.

Likewise, commitment module 212 may comprise code enabling the client computer 200 to generate verification signatures from partial signatures, using techniques similar to the techniques used to generate the key generation seed from partial computations, as described above (e.g., interpolation using Lagrange polynomials, and the like).

7. Cryptography Module

Cryptography module 218 may comprise code or instructions enabling processor 202 to generate cryptographic keys and perform other cryptographic operations, including the encryption of messages and decryption of ciphertext using cryptographic keys. These cryptographic keys may be generated from key generation seeds. Key generation depends on the particular cryptosystem being used to perform cryptography. For example, for an "AES-128-CBC" cryptosystem (an AES block cipher with a 128 bit key operating in cipher block chaining mode), a key generation algorithm may accept a passphrase or key generation seed as an input and produce a 128 bit key for an AES block cipher.

Client computer 200 may use cryptography module 218 to generate cryptographic keys used to encrypt messages or decrypt ciphertext. The key generation seed used by cryptography module 218 may be derived, wholly or in part, from partial computations received from cryptographic devices. The key generation seed may comprise a product of intermediate computations generated by exponentiating partial computations using their corresponding Lagrange coefficients. These partial computations may be generated by the cryptographic devices using a first commitment received from the client computer 200, a second commitment received from the client computer 200, and a first secret share and second secret share, as described above in Section I. Thus, the key generation seed and the cryptographic key may be derived indirectly from the secret shares, as the secret shares are used to generate the partial computations that are used to generate the intermediate computations, which can in turn be combined and used as the key generation seed.

8. Verification Module

Verification module 220 may comprise code or instructions, executable by processor 202 for verifying partial computations using check values. These check values may have been published by a trusted external server (e.g., trusted external server 116 from FIG. 1). Each check value may correspond to a secret share stored by a cryptographic device in a cryptographic device network. Client computer 200 may use the code or instructions stored in verification module 220 to execute an honest verifier zero knowledge (HVZK) proof in order to verify the legitimacy of the partial computations. Verification module 220 may comprise code or instructions enabling any appropriate implementation of the HVZK proof, including Schnorr's protocol and Fiat-Shamir.

D. Cryptographic Device

Figure 3:
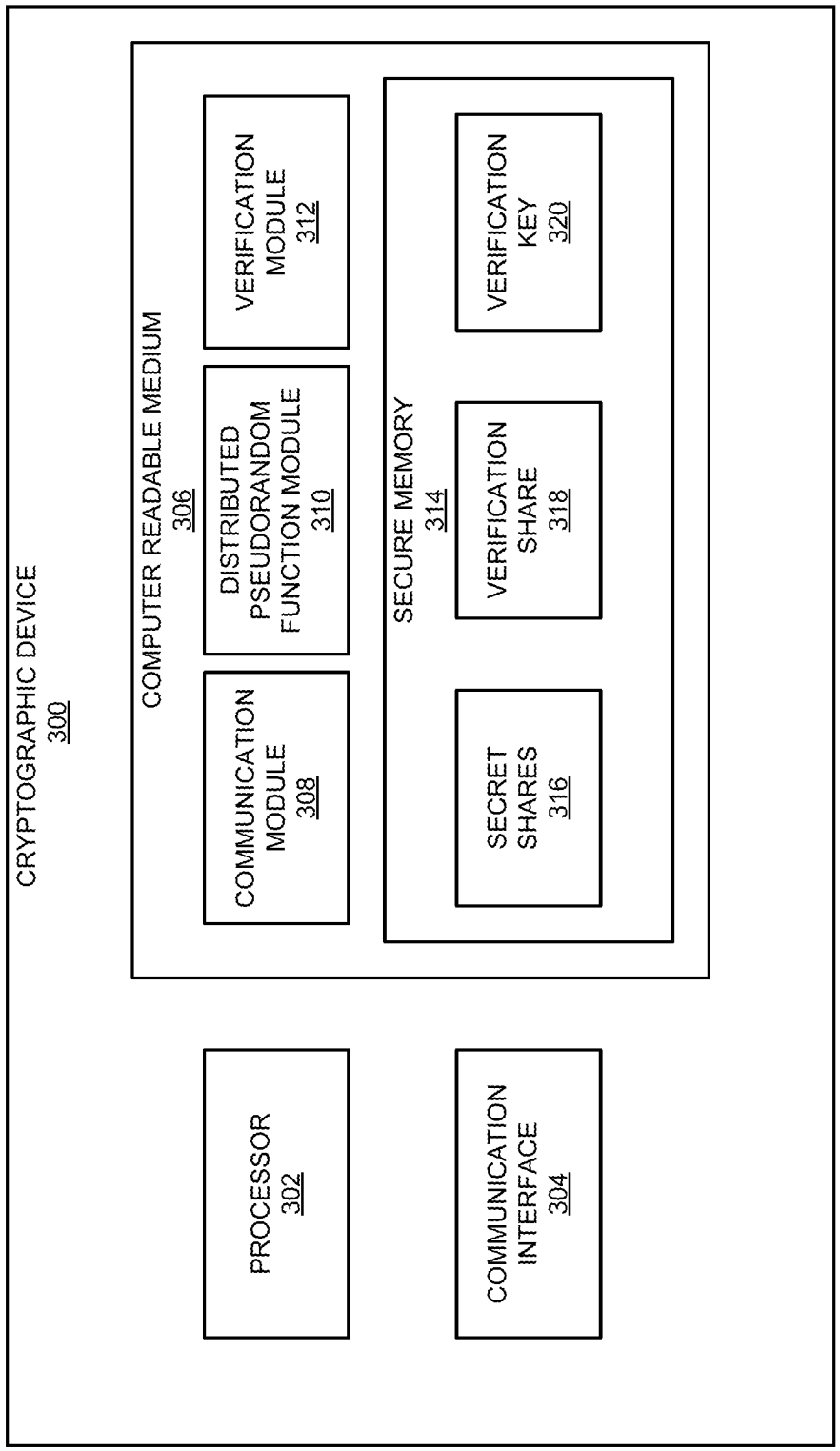
FIG. 3 shows a system block diagram of an exemplary cryptographic device according to some embodiments.

FIG. 3 displays an exemplary cryptographic device 300 according to some embodiments. The cryptographic device 300 may comprise a computer or other device in a cryptographic device network. In some embodiments, cryptographic device 300 may comprise a server computer. Cryptographic device 300 may store multiple secret shares and verification shares, derived from multiple secret values and a verification value. Additionally, cryptographic device 300 may store a verification key used to verify a verification signature. The secret shares and verification shares may be used by the cryptographic device to generate partial computations and partial signatures using a distributed pseudorandom function. The partial computations may be used by a client computer to generate a cryptographic key. The cryptographic key can be used by the client computer to encrypt or decrypt messages. Cryptographic device 300 may comprise a processor 302, a communication interface 304, and a computer readable medium 306.

1. Processing, Communicating, and Storing

Processor 302 may comprise any suitable data computation device or devices. Processor 302 may be able to interpret code and carry out instructions stored on computer readable medium 306. Processor 302 may comprise a central processing unit (CPU) operating on a reduced instructional set, and may comprise a single or multi-core processor. Processor 302 may include an arithmetic logic unit (ALU) and a cache memory. These components may be used by processor 302 in executing code or other functions.

Communications interface 304 may comprise any interface by which cryptographic device 300 may communicate with other computers or devices. Examples of communication interfaces include wired interfaces, such as USB, Ethernet, or FireWire. Examples also include interfaces used for wireless communication, such as a Bluetooth or Wi-Fi receiver. Cryptographic device 300 may possess multiple communication interfaces 304, such as a micro USB port, an Ethernet port, a cellular receiver, a Bluetooth receiver, etc.

Cryptographic device 300 may communicate with other devices or computers using communication interface 304 via one or more secure and authenticated point-to-point channels. These channels may use standard public-key infrastructure. For example, cryptographic device 300 and a client computer may exchange a symmetric key via their communication interfaces. This key exchange may comprise a Diffie-Hellman key exchange. After exchanging cryptographic keys, cryptographic device 300 and the client computer may communicate over a public channel (such as an unsecured network) using a standard authenticated encryption scheme to encrypt any message with the cryptographic key. Further authentication methods can also be used, e.g., digital signatures. By performing this key exchange, communications between cryptographic device 300 and a client computer client computer (e.g., commitments, partial computations, partial signatures, verification signatures, etc.) may be encrypted, allowing cryptographic device 300 and the client computer to communicate securely over an unsecured network.

Computer readable medium 306 may comprise hardware that may possess or store code, data or instructions that can be interpreted by processor 302. Computer readable medium 306 may store or otherwise comprise a number of software modules, including a communication module 308, a distributed pseudorandom function module 310, a verification module 312, and a secure memory 314. The secure memory element may store secret shares 316, a verification share 318, and a verification key 320.

2. Communication Module

Communication module 308 may comprise or include code or instructions that may be used by processor 302 to enable the cryptographic device 300 to communicate with other computers or devices, including client computers, proxy devices, and trusted external servers, using any appropriate communications protocol. Communication module 308 may comprise code or instructions, executable by the processor 302 for receiving requests for cryptographic services from client computers (e.g., requests to perform encryption or decryption), receiving commitments and verification signatures from client computers, and transmitting partial computations and partial signatures to client computers.

Additionally, communication module 308 may comprise code enabling the cryptographic device 300 to communicate with a trusted external server and receive secret shares and verification shares from the trusted external server. The communications module 308 may enable this communication during a secret share provisioning phase performed prior to distributed symmetric encryption or decryption.

3. Distributed Pseudorandom Function Module

The distributed pseudorandom function module 310 may comprise code for the purpose of evaluating pseudorandom functions (PRFs) or distributed pseudorandom functions (DPRFs). This may include, for example, performing cryptographic operations associated with elliptic curve cryptography, block ciphers such as AES, or hash functions such as SHA-2.

As an example, the distributed pseudorandom function module 310 may comprise code that may be used by processor 302 in order to implement elliptic curve cryptography under the decisional Diffie-Hellman assumption. Elliptic curve cryptography may be used to generate partial computations based on commitments (e.g., a first commitment and a second commitment) and secret shares 316. These partial computations may be combined into a single partial computation, and transmitted to a client computer. The client computer can use this partial computation, along with other partial computations received from other cryptographic devices to produce a cryptographic key that can be used to encrypt a message or decrypt ciphertext, for example, as described above in Section I.

Thus processor 302 may use the distributed pseudorandom function module 310 in order to perform elliptic curve cryptography using a first commitment $H_1(m)$ of a message m and a second commitment $H_2(m)$ of the message as inputs. Alternatively, the processor 302 may use the distributed pseudorandom function module 310 to generate a first commitment $H_1(m, r_1)$ and a second commitment $H_2(m, r_2)$, using the message m, and two independent random values $r_1$ and $r_2$ as inputs. These commitments may be converted into points in an elliptic curve group, which may each be point multiplied by a respective secret multiplicand (e.g., a first secret share and a second secret share of secret shares 316) to produce product points. The product points may comprise partial computations that may be combined into a single partial computation (e.g., by calculating the product) and transmitted to a client computer. Given the same commitment inputs and the same secret shares 316, the resulting partial computation will be the same, enabling the partial computation to be used to generate consistent encryption and decryption keys.

4. Verification Module

Verification module 312 may comprise code or instructions, executable by processor 302 for generating partial signatures and verifying verification signatures. As stated above, verification signatures may be used by cryptographic device 300 to determine whether a client computer is making legitimate use of the distributed symmetric cryptography system, and whether the client computer is encrypting data or decrypting data. The presence of a valid verification signature may indicate that the client computer is decrypting data, as the cryptographic device 300 may verify the verification signature during distributed symmetric decryption.

Verification module 312 may use a verification share 318 (stored in secure memory 314) in order to generate a partial signature from one or more commitments (e.g., the first commitment and/or second commitment) received from a client computer. Verification module 312 may generate the partial signature by encrypting the commitment using its corresponding verification share 318 and elliptic curve cryptography. Alternatively, verification module 312 may generate the partial signature by encrypting the commitment using its corresponding verification share 318 and any appropriate form of homomorphic cryptography. As another alternative, verification module 312 may generate the partial signature using one or more commitments, the verification share 318 and an appropriate message authentication code (MAC) algorithm.

The cryptographic device 300 may transmit the partial signature to the client computer, which may also receive a number of other partial signatures from other cryptographic devices. The client computer may combine these partial signatures to generate a verification signature. The client computer may then store the verification signature. At another time, when the client computer wants to decrypt a ciphertext, the client computer may transmit the verification signature to cryptographic device 300. Cryptographic device 300 may then use the verification module 312 and a verification key 320 to verify the verification signature. Verification key 320 may correspond to a verification value used to produce verification share 318 and other verification shares belonging to other cryptographic devices. In some embodiments, verification key 320 and the verification value may comprise an asymmetric key pair. As an example, verification key 320 may comprise a public cryptographic key and the verification value corresponding to verification share 318 may comprise a private cryptographic key.

A verification signature may comprise one or more commitments $H_n(m)$ encrypted using the verification value. The verification signature may be decrypted using verification key 320 to produce the one or more commitment $H_n(m)$. Cryptographic device 300 may use verification module 312 in order to decrypt the verification signature using verification key 320 and compare the resulting commitment to a commitment received from a client computer. If the two commitments match, the verification signature may be legitimate. Alternatively, cryptographic device 300 may use verification module 312 to verify a verification signature using any other appropriate method, such as a method based off pairing friendly elliptic curves, message authentication codes (MACs), hashed message authentication codes (HMACs) etc. Example techniques for verifying signatures can be found in: [1] Boldyreva A. (2003) "Threshold Signatures, Multisignatures and Blind Signatures Based on the Gap-Diffie-Hellman-Group Signature Scheme." In: Desmedt Y. G. (eds) Public Key Cryptography—PKC 2003. PKC 2003. Lecture Notes in Computer Science, vol 2567. Springer, Berlin, Heidelberg; [2] Victor Shoup. 2000. "Practical threshold signatures." In Proceedings of the 19th international conference on Theory and application of cryptographic techniques (EUROCRYPT'00). Springer-Verlag, Berlin, Heidelberg, 207-220; and [3] Naor M., Pinkas B., Reingold O. (1999) Distributed Pseudo-random Functions and KDCs. In: Stern J. (eds) Advances in Cryptology—EUROCRYPT'99. EUROCRYPT 1999. Lecture Notes in Computer Science, vol 1592. Springer, Berlin, Heidelberg.

5. Secure Memory

Secure memory 314 may comprise a memory region of computer readable medium 306 or a standalone memory element. Secure memory 314 may store sensitive cryptographic materials in such a way that they are difficult to retrieve by an unauthorized outsider (e.g., a hacker). As an example, data stored in secure memory 314 may be stored in encrypted form. The secure memory 314 may store secret shares 316 derived from multiple secret values (e.g., a first secret value and a second secret value). Additionally, secure memory 314 may store a verification share 318 derived from a verification value, as well as a verification key 320 corresponding to the verification value. Cryptographic device 300 may use secret share 316 to generate a partial computation that is used to generate a cryptographic key. Likewise, cryptographic device 300 may use verification share 318 to derive a partial signature used to generate a verification signature. Cryptographic device 300 may use verification key 320 to verify a verification signature generated from a plurality of partial signatures.

III. Generating and Distributing Secret Shares and Verification Values

Before describing methods for adaptive attack resistant symmetric cryptography, it may be helpful to describe methods that may be used to distribute secret shares and verification shares to cryptographic devices in a cryptographic device network.

For the purposes of illustration, a non-limiting example of generation and distribution of secret shares and verification shares is described below with reference to FIGS. 4 and 5. However, it should be understood that any appropriate method may be used to generate and distribute secret shares and verification shares to cryptographic devices.

Figure 4:
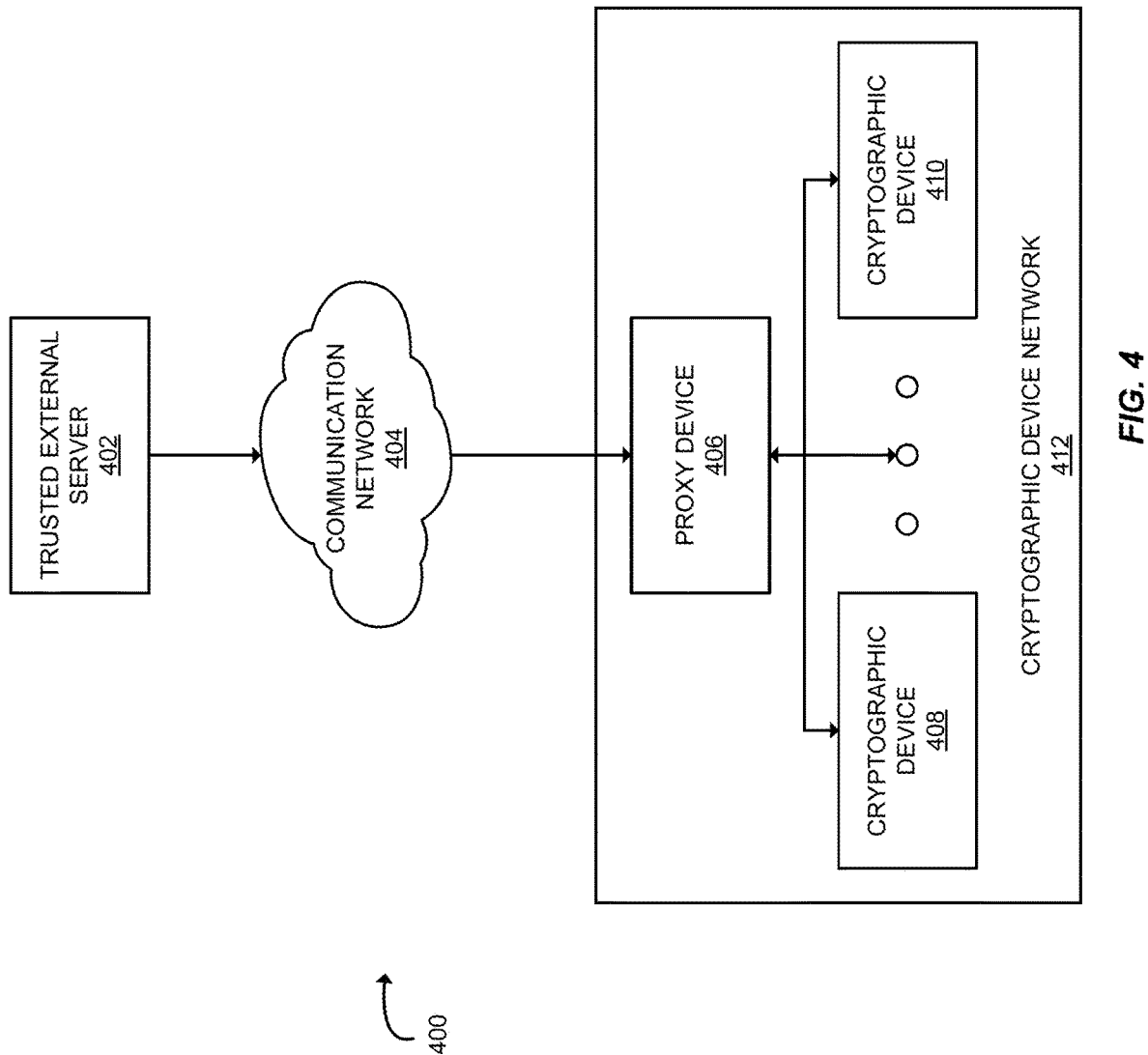
FIG. 4 shows a system block diagram for an exemplary secret share and verification share provisioning system according to some embodiments

FIG. 4 shows a secret and verification share distribution system 400 comprising a trusted external server 402, a communication network 404 and a cryptographic device network 412. The cryptographic device network 412 may comprise an optional proxy device 406 and cryptographic devices 408-410. Notably, although only two cryptographic devices 408 and 410 are shown, the cryptographic device network 412 may comprise any number of cryptographic devices.

The trusted external server 402 can comprise a server computer capable of generating and distributing secret shares, verification shares, and verification keys. The trusted external server 402 may be capable of communicating with cryptographic devices 408-410 or proxy device 406 via communication network 404. The trusted external server 402 may possess a processor and a computer readable medium, and may be capable of performing any operations necessary to generate secret values, secret shares, verification values, or verification shares in accordance with any appropriate secret sharing scheme (e.g., using Shamir's secret sharing, as described above). As an example, the trusted external server 402 could generate random numbers corresponding to the coefficients of a first polynomial $P_1(x)$ and a second polynomial $P_2(x)$. Two of these random numbers (for example, the random number associated with the zeroth order coefficients of polynomial $P_1(x)$ and $P_2(x)$) can be interpreted as a first secret value and a second secret value respectively. In order to produce secret shares, the trusted external server 402 could evaluate the polynomials at distinct values of x. For example, by evaluating the polynomials at values of x corresponding to serial numbers or unique identifiers of cryptographic devices 408-410. Secret shares comprising the polynomials evaluated at their respective values of x can be distributed to cryptographic devices 408-410 via communication network 404.

The communication network 404 may comprise a network such as the Internet or a cellular communication network by which devices, computers, and servers can communicate with one another. The communication network 404 may be secure or unsecure. The trusted external server 402 may communicate with the cryptographic device network 412 via communication network 404, e.g., the trusted external server 402 may transmit secret shares, verification shares, and verification keys to the cryptographic device network via communication network 404.

The cryptographic device network 412 may comprise cryptographic devices 408 and 410, as well as a proxy device 406. The proxy device 406 may serve as a gateway that mediates communication between cryptographic devices 408 and 410 and computers, devices, or servers external to the cryptographic device network 412 (e.g., trusted external server 402). Secret shares or verification shares may be transmitted by trusted external server 402 to proxy device 406 via communication network 404. Proxy device 406 may distribute the secret shares to their respective cryptographic devices 408-410.

Cryptographic devices 408-410 may be substantially similar to cryptographic devices described above with reference to FIGS. 1 and 3. They may possess a processor, communication interface, and a computer readable medium. The computer readable medium may possess or comprise a number of software modules used by the cryptographic devices 408 and 410 for performing distributed symmetric cryptography. The cryptographic devices 408 and 410 may additionally comprise a secure memory element. The cryptographic devices 408 and 410 may store secret shares, verification shares, and verification keys received from trusted external server 402 in their respective secure memory elements.

Figure 5:
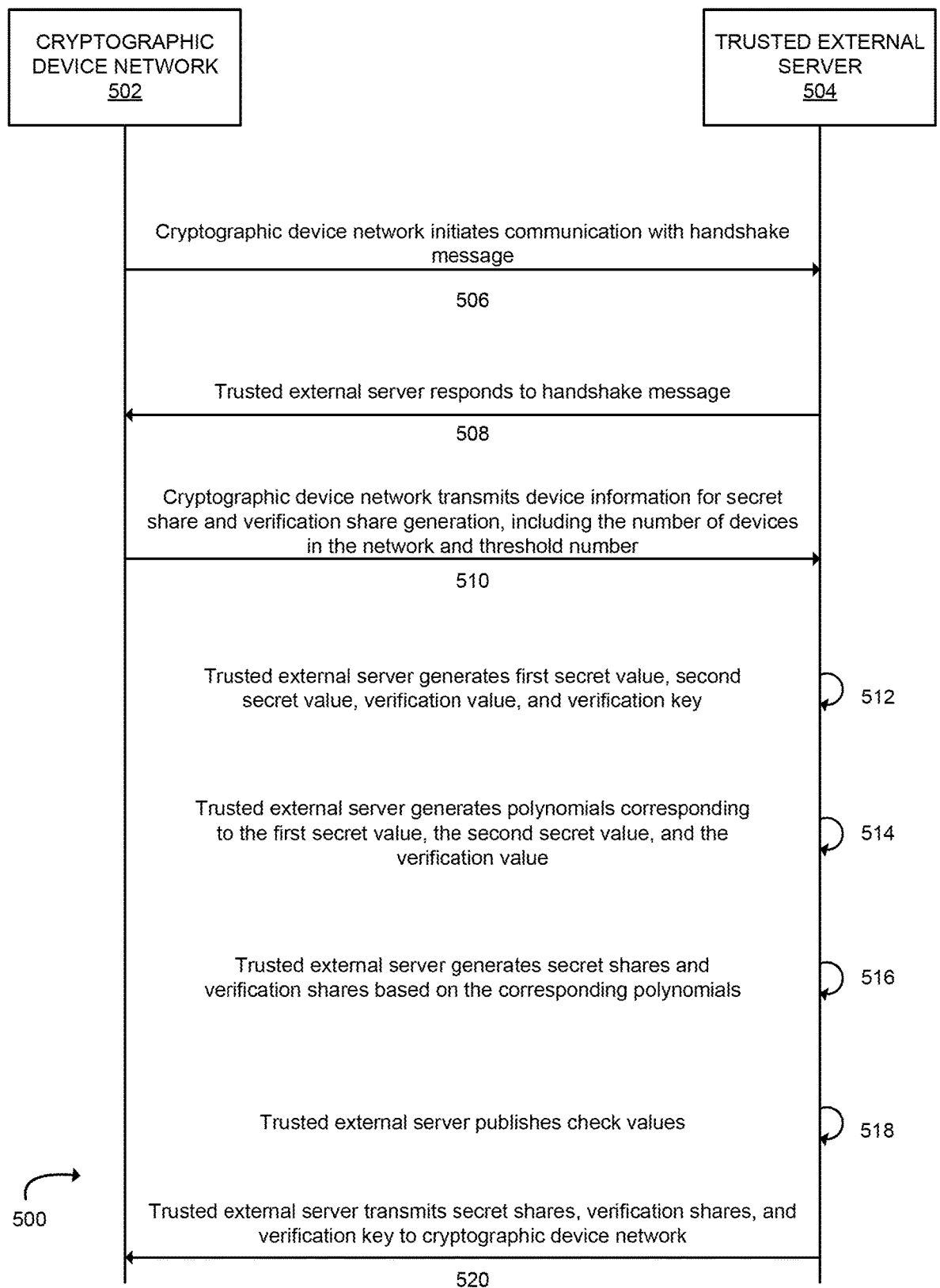
FIG. 5 shows a sequence diagram for an exemplary secret share and verification share provisioning process according to some embodiments.

FIG. 5 shows a sequence diagram detailing one exemplary method 500 by which secret shares, verification values, and verification keys could be generated and distributed. It should be understood that embodiments can be practiced with any appropriate method for generating and distributing secret shares, verification shares, and verification keys, and thus the exemplary method of FIG. 5 is intended to be non-limiting. Although the communication network 404 from FIG. 4 is not explicitly shown, communications between the cryptographic device network 502 and trusted external server 504 may pass through a communications network. Likewise, although proxy device 406 from FIG. 4 is not shown, communications to the cryptographic device network 502 may be received by a proxy device on behalf of the cryptographic device network 502.

Steps 506 and 508 are two steps of a handshaking procedure between the cryptographic device network 502 and the trusted external server 504. Some communication protocols, such as the transmission control protocol (TCP) use handshaking procedures to establish the rules or characteristics of future communications between the participating computers. As an example, if communications between cryptographic device network 502 and trusted external server 504 are encrypted, steps 506 and 508 may involve an exchange of encryption keys between the cryptographic device network 502 and trusted external server 504.

For example, the cryptographic device network 502 (or a proxy device) may possess a symmetric cryptographic key that can be used to encrypt and decrypt messages sent between the cryptographic device network 502 and the trusted external server 504. The trusted external server 504 may possess a private key of a public-private key pair. The cryptographic device network 502 could use the public key of the public-private key pair to encrypt the symmetric cryptographic key, then transmit the symmetric cryptographic key to the trusted external server 504. Using the private key, the trusted external server 504 can decrypt the symmetric cryptographic key. At this point, both the cryptographic device network 502 and trusted external server 504 possess the symmetric cryptographic key. The cryptographic device network 502 and trusted external server 504 can use the symmetric cryptographic key to encrypt and decrypt any future communications between them.

At step 510 the cryptographic device network 502 may transmit information necessary to complete the secret share and verification share generation and distribution process. This could include information such as the number of devices in the cryptographic device network, the threshold number of devices for the cryptographic device network, address information, the number of secret shares requested per device (e.g., two) and any requested sampling values (such as the serial numbers or unique identifiers of the cryptographic devices in the cryptographic device network 502. Address information may comprise digital addresses associated with each cryptographic device in the cryptographic device network 502, such as IP addresses or MAC addresses. Requested sample values may correspond to particular values of x used to sample polynomials $P_n(x)$ in order to generate secret shares or verification values. For example, a sample value may be the number 5, and the secret shares corresponding to that sample value may comprise (5, $P_1(5)$) and (5, $P_2(5)$).

As an example, in step 510, the cryptographic device network 502 could transmit a series of packets, each containing the requested sample value, and the address for each cryptographic device corresponding to the requested sample value, such as the IP address or MAC address. Additionally, the packets may include information such as a TCP or UDP port on which to communicate with the cryptographic devices in the cryptographic device network 502.

At step 512 the trusted external server 504 can generate the secret values (e.g., a first secret value and a second secret value), verification value, and verification key. Methods by which the trusted external server 504 generate the secret values depend on the secret sharing methodology used, as well as the distributed pseudorandom function used during distributed symmetric cryptography. Likewise, the method by which verification values and verification keys are generated depend on the particular methods used to verify verification signatures using verification keys. In some embodiments, the first and second secret values may comprise random numbers, and the trusted external server 504 may generate the secret values using a cryptographically secure random number generator. In some embodiments, the verification value and verification key may comprise an asymmetric key pair, and the verification value and verification key may be generated using any appropriate means for generating asymmetric key pairs according to any appropriate cryptosystem (e.g., RSA).

At step 514, the trusted external server 504 can generate multiple polynomials corresponding to the secret values (e.g., a first polynomial corresponding to a first secret value and a second polynomial corresponding to the second secret value) as well as a polynomial corresponding to the verification value. The trusted external server can encode the secret values into one of the coefficients of the their respective polynomials and encode the verification value into one of the coefficients of the verification value polynomial. In some embodiments, the secret values and verification value may be encoded into the zeroth order coefficient of their respective polynomials. The trusted external server 504 may generate other coefficients of the polynomials (e.g., the first to $n^{th}$ order coefficients) using any appropriate techniques. For example, the other coefficients may comprise random or pseudorandom numbers.

Characteristics of the polynomials (e.g., how may coefficients to include) may be based wholly or in part on information received by the trusted external server 504 in step 510 (e.g., the number of secret shares and verification shares). As described above, k+1 unique points are needed to uniquely define a polynomial of degree k. Thus the number of coefficients in the first polynomial and the second polynomial may be equal to a threshold number of secret shares requested at step 510. Likewise, the number of coefficients in the verification value polynomial may be equal to a threshold number of verification shares requested at step 510.

At step 516, the trusted external server 504 may generate secret shares and verification shares based on the corresponding polynomials. The trusted external server 504 may sample the first and second secret value polynomial and the verification share polynomial at unique values of x in order to produce corresponding values of P(x). These paired (x, P(x)) values may comprise the secret shares. The x values may comprise preferred sampling values provided to the trusted external server 504 at step 510 (e.g., serial numbers or device identifiers associated with the cryptographic devices in cryptographic device network 502).

At step 518, the trusted external server 504 may publish check values corresponding to the secret shares. These check values may be used by a client computer to verify partial computations received from cryptographic devices in the cryptographic device network 502. The client computer may use these check values to perform an honest verifier zero knowledge (HVZK) proof in order to verify the partial computations without learning anything about the secret shares. A check value may comprise a modular exponentiation of a generator g using the secret shares corresponding to each cryptographic device $u_i$, $v_i$, where g is the generator of the elliptic curve group G used to implement distributed pseudorandom functionality, $u_i$ is the first secret share corresponding to the $i^{th}$ cryptographic device, and $v_i$ is the second secret share corresponding to the $i^{th}$ cryptographic device. That is, the check values corresponding to the $i^{th}$ cryptographic device may comprise the pair $g^{u_i}$, $g^{v_i}$. The trusted external server may publish these check values for each cryptographic device in the cryptographic device network 502. Publishing these check values may comprise making these check values readily available to client computers, e.g., by transmitting the check values to the client computers, or by making the check values available on a public webserver.

At step 520 the trusted external server 504 may transmit the secret shares, verification shares, and verification key to cryptographic devices in the cryptographic device network 502 using routing or address information provided in step 510. In this way each cryptographic device in the cryptographic device network 502 may receive its respective secret share and verification share, as well as the verification key common to all cryptographic devices.

The exemplary method of FIG. 5 is one non-limiting example of a secret share generation and distribution process. There are numerous variations that may become apparent to one skilled in the art. As another example, the cryptographic devices could receive their respective secret shares via a cryptographic method such as oblivious transfer. As another example, the cryptographic device network 502 could generate the secret shares without the assistance of a trusted external server 504 at all, by using methods such as secure multi-party computation.

IV. Attack Resistant Distributed Symmetric Cryptography

Adaptive attack resistant distributed symmetric cryptographic methods are described below with reference to FIGS. 6-7. FIGS. 6A-6B show a sequence diagram of an exemplary method used to perform distributed symmetric encryption, while FIGS. 7A-7B show a sequence diagram of an exemplary method used to perform distributed symmetric decryption.

As described above, embodiments achieve adaptive attack resistance by generating multiple partial computations corresponding to multiple secret shares (generated from multiple respective secret values). In some embodiments, two secret values and two secret shares are used by each cryptographic device, however, embodiments can be practiced with any plurality of secret values and secret shares. Partial computations generated by the cryptographic devices (e.g., a first partial computation and a second partial computation) can be combined by those cryptographic devices (e.g., by calculating the product of the partial computations) before transmitting the resulting single partial computation to the client computer. Even if the client computer (or a malicious eavesdropper) knows the commitments used to generate the respective partial computations and the resulting combination, the client computer or malicious eavesdropper cannot determine the secret shares from this known information, because there are an exponentially large number of combinations of potential secret shares that could produce the resulting combination. In this way, the secret shares are kept safe from attackers, even attackers using sophisticated adaptive attacks.

As indicated above, in distributed symmetric operations, it may not be possible for the cryptographic devices to determine whether the client computer is encrypting a message or decrypting ciphertext. This is because distributed encryption and decryption is substantially the same from the perspective of the cryptographic devices: The client computer transmits a commitment to the cryptographic devices, the cryptographic devices generate a partial computation, and the cryptographic devices return the partial computation to the client computer. The client computer then generates a cryptographic key based on the partial computations and uses the cryptographic key to encrypt a message or decrypt ciphertext. As such, in distributed symmetric operations, it may not be possible for the cryptographic devices to determine whether the client computer is encrypting data or decrypting data. This in turn makes it difficult to log the behavior of client computers, or prevent misuse by malicious client computers.

A. Encryption

FIG. 6A shows a first part of an exemplary method of adaptive attack resistant distributed symmetric encryption according to some embodiments. FIG. 6A shows a client computer 602, along with three cryptographic devices 604-608, along with a number of steps 610-616 associated with the exemplary method. Although a proxy device and communications network are not shown, in some embodiments, communications between the client computer 602 and cryptographic devices 604-608 may be mediated or transmitted via a proxy device and/or a communications network.

At step 610, the client computer 602 can select a first hash function $H_1$ and a second hash function $H_2$. These hash functions may be later used by the client computer 602 to generate a first commitment and second commitment. The client computer 602 may select these hash functions from a plurality of hash functions. The client computer 602 may store a list, database, or other repository of hash functions in memory (for example, in a commitment module). The client computer 602 may select these hash functions using any appropriate methodology (e.g., based on the preference of a client associated with the client computer, trust scores, etc.). In some embodiments, these hash functions may be selected randomly. Random selection of hash functions may be advantageous because it makes it difficult or impossible for an attacker to determine hash functions from their resulting commitments.

At step 612, the client computer 602 can generate a first commitment $h_1$ and a second commitment $h_2$ using the first hash function $H_1$ and the second hash function $H_2$. The first commitment and second commitment can be generated by providing a message m as the input to the first hash function and the second hash function respectively. In some embodiments, the commitments may additionally be generated using one or more random values r. Rather than hashing the message alone, the client computer 602 can hash the message in addition to the random value (e.g., by concatenating the message and the random value). The random value may obscure or hide the message, protecting it against some forms of cryptographic attack (e.g., a replay attack).

At step 614, the client computer 602 may select a plurality of cryptographic devices (e.g., a predetermined threshold number of participating cryptographic devices). This threshold number of cryptographic devices may comprise the minimum number of participating cryptographic devices needed to perform distributed symmetric encryption or may be all of the cryptographic devices provisioned with secret shares. In FIG. 6A, the client computer 602 selects cryptographic devices 604 and 606. The client computer 602 may select the participating cryptographic devices via any appropriate means or selection criteria. For example, the client computer 602 may select the participating cryptographic devices randomly, or according to a trust or security score. For example, a trust or security score may relate to the likelihood that a particular cryptographic device has been compromised by a hacker, or by the relative security of the hardware of that cryptographic device (e.g., the trust score may depend on whether the cryptographic device possesses secure memory or a trusted platform module). The client computer 602 may select the participating cryptographic devices using a proxy device (not shown). The client computer 602 may transmit a request to the proxy device requesting a threshold number of participating cryptographic devices. The proxy device may then select the participating cryptographic devices on behalf of the client computer 602.

At step 616, the client computer 602 can transmit an encryption request including the first commitment $h_1$ and the second commitment $h_2$ to the plurality of participating cryptographic devices (i.e., cryptographic device 604 and cryptographic device 606). The client computer 602 may transmit the request via a proxy device, such that the client computer transmits the first commitment and the second commitment to the proxy device and the proxy device transmits the first commitment and the second commitment to the plurality of participating cryptographic devices.

Figure 6B:
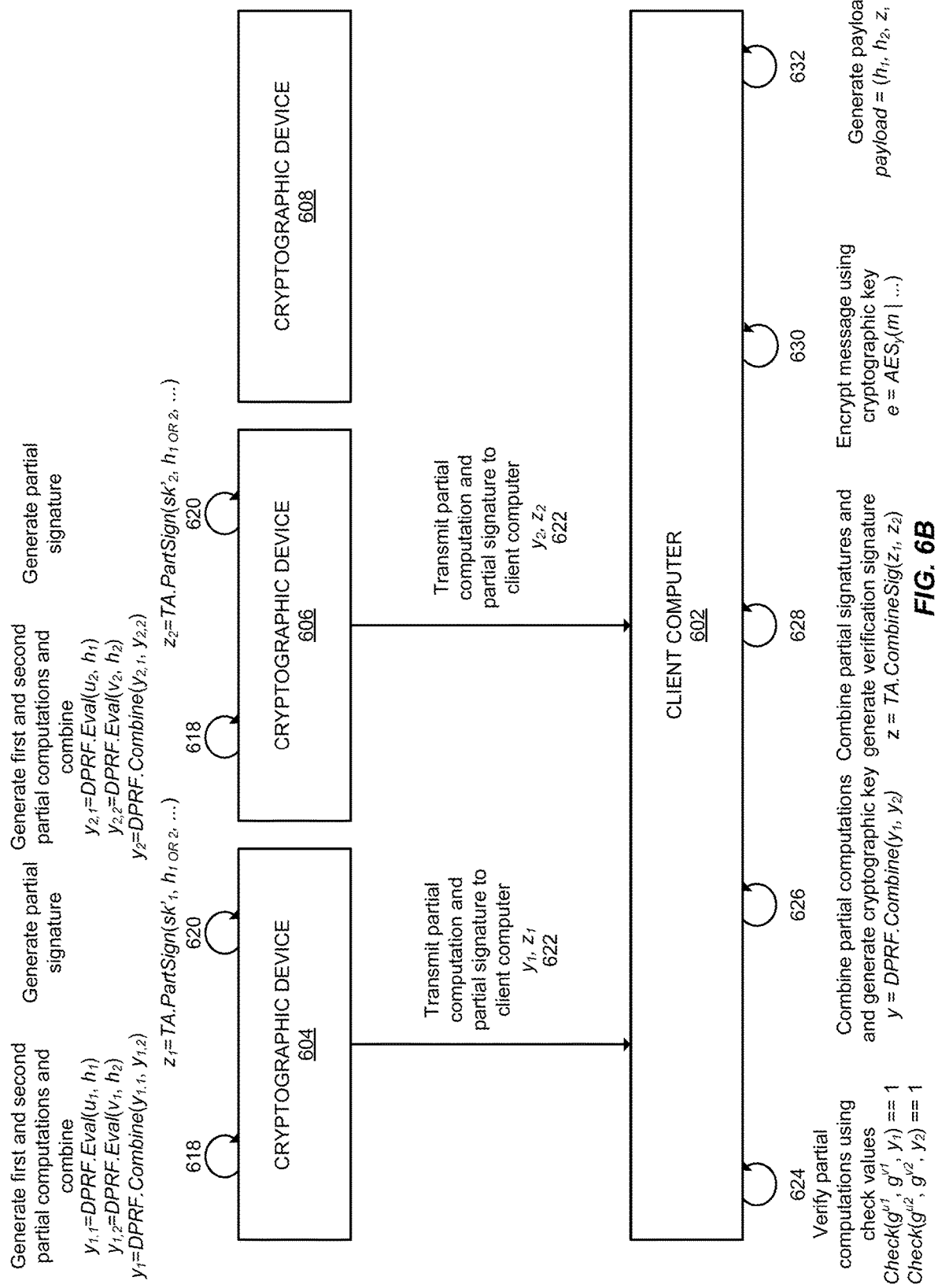
FIG. 6B shows a hybrid sequence diagram for a second part of an exemplary method of adaptive attack resistant distributed symmetric encryption.

FIG. 6B shows the second part of the exemplary method of distributed symmetric encryption according to some embodiments. At step 618, the participating cryptographic devices (i.e., cryptographic device 604 and 606) can each generate a first partial computation $y_{n,1}$ and a second partial computation $y_{n,2}$. The participating cryptographic devices can then combine their respective first and second partial computations to produce a partial computation $y_n$.

Each participating cryptographic device can generate their first partial computation $y_{n,1}$ using a respective first secret share $u_n$ and the first commitment $h_1$. The participating cryptographic devices may generate these first partial computations using a DPRF.Eval function, which evaluates a distributed pseudorandom function using the first commitment and the first secret share as arguments. In some embodiments, the distributed pseudorandom function may comprise an elliptic curve cryptographic function implementing elliptic curve cryptography. That is, the cryptographic devices may use the DPRF.Eval function to encrypt the first commitment using their respective first secret shares as cryptographic keys. In doing so, each cryptographic device 604 and 606 may produce a first partial computation.

The second partial computations $y_{n,2}$ can be generated using the respective second secret shares $v_n$ and the second commitment $h_2$ in a similar manner. As an example, the cryptographic devices 604 and 606 can use a DPRF.Eval function (such as an elliptic curve cryptography function) to encrypt the second commitment using the second secret share as a cryptographic key, thereby producing the second partial computations.

As stated above, in some embodiments, the first partial computation $y_{n,1}$ and the second partial computation $y_{n,2}$ can be generated by evaluating a distributed pseudorandom function, such as an elliptic curve cryptography function. This may comprise the cryptographic devices 604 and 606 encrypting the first commitment $h_1$ and the second commitment $h_2$ using the first secret share $s_{n,1}$ and the second secret share $S_{n,2}$ to produce the first partial computation and the second partial computation respectively. In an elliptic curve cryptosystem, this may comprise converting the first commitment and the second commitment into points in an elliptic curve group, then exponentiating those points using the first secret share and second secret share, i.e., $y_{n,1}=h_1^{s_{n,1}}$ and $y_{n,2}^{s_{n,2}}$.

The cryptographic devices 604 and 606 may each combine their respective first partial computation $y_{n,1}$ and second partial computation $y_{n,2}$ to produce partial computations $y_n$. These partial computations may be used by the client computer 602 to generate a cryptographic key at a later time. The cryptographic devices 604 and 606 may use a DPRF.Combine($y_{n,1}$, $y_{n,2}$) function with the respective first partial computation and second partial computation as inputs to produce the output partial computations. In some embodiments, the DPRF.Combine function may comprise a product function that calculates the product of the two partial computations. For example, the cryptographic devices 604 and 606 may produce their respective partial computations $y_n$ using the following formula: $y_n = y_{n,1} * y_{n,2} = h_1^{s_{n,1}} * h_2^{s_{n,2}}$.

Optionally, at step 620, the cryptographic device 604 and 606 may each generate a respective partial signature $z_n$ using the first commitment $h_1$ and/or the second commitment $h_2$ and a verification share $sk'_n$. The cryptographic devices may generate each partial signatures using a threshold authentication partial signature function (TA.PartSign). the TA.PartSign function may take in the first commitment and/or the second commitment and the verification share as inputs and produce the partial signature as an output. In some embodiments, the TA.PartSign function may comprise a distributed pseudorandom function. As an example, the TA.PartSign function may comprise an elliptic curve cryptography function. This function may encrypt the first commitment and/or second commitment using the verification share to produce the partial signature.

At step 622, the cryptographic devices 604 and 606 can transmit their respective partial computations $y_n$ and optionally their respective partial signatures $z_n$ to the client computer 602. In some embodiments, the client computer 602 may receive this plurality of partial computations and plurality of partial signatures from a proxy device, wherein the proxy device receives the plurality of partial computations and the plurality of partial signatures from participating cryptographic devices 604 and 606.

At step 624, the client computer 602 can retrieve a plurality of check values $g^{um}$, and $g^{vm}$ and verify the partial computations $y_n$ using the plurality of check values. As described above with reference to FIG. 5, a trusted external server that produced the secret values and secret shares may publish the check values. The client computer may retrieve these published check values from the trusted external server, for example, via a web request. The client computer 602 may perform an honest verifier zero knowledge (HVZK) proof in order to verify these partial computations. The client computer 602 may use a Check function in order to execute the HVZK proof. The Check function may execute the HVZK proof according to any appropriate protocol (e.g., Schnorr's protocol, Fiat-Shamir, etc.). The client computer 602 can invoke HVZK proving procedures in parallel for each check value (e.g., invoking an HVZK proving procedure for $g^{um}$ and another HVZK proving procedure for $g^{vm}$). Further details on HVZK proofs and techniques to perform HVZK proofs can be found in [4] Faust et al "On the Non-malleability of the Fiat-Shamir Transform" in Cryptology ePrint Archive, Report 2012/704, 2012, and [5] Agrawal, Mohassel, Mukherjee, and Rindal "DiSE: Distributed Symmetric-key Encryption" in Cryptology ePrint Archive, Report 2018/727, 2018. Based on the description in the present disclosure and these references, the skilled person will understand how to implement HVZK proofs in the present content.

At step 626, the client computer 602 may combine the plurality of partial computations to produce a cryptographic key y. This cryptographic key may be used by the client computer 602 to encrypt a message m. The client computer 602 may combine the partial computations using a DPRF.Combine($y_1$, $y_2$) function, which may take the plurality of partial computations as an input and produce a symmetric cryptographic key or a key generation seed that can be used to generate a symmetric cryptographic key. The DPRF.Combine function executed by the client computer 602 may be similar to the DPRF.Combine function executed by cryptographic devices 604 and 606, in that it is used to combine multiple partial computations into a single output. In some embodiments, both functions combine the partial computations by calculating a product of the partial computations. However, the DPRF.Combine function executed by the client computer 602 may first generate intermediate calculations by exponentiating each partial computation $y_n$ with its corresponding Lagrange coefficient in $\lambda_n$ (i.e., $y_n^{\lambda_n}$) before calculating the product of those intermediate calculations. In some embodiments, the output of the DPRF.Combine function y may be calculated using the formula $y = \Pi_i y_i^{\lambda_i} = \Pi_i (h_{i,1}^{s_{i,1}} + h_{i,2}^{s_{i,2}})^{\lambda_n}$.

In some embodiments, the client computer 602 may use Lagrange interpolation in order to generate intermediate calculations. These intermediate calculations may then be combined to produce the cryptographic key or key generation seed. The client computer 602 may exponentiate each partial computation $y_n$ of the plurality of partial computations using a respective Lagrange coefficient $\lambda_n$ (i.e., $y_n^{\lambda_n}$) as described above in Section I, in order to produce a plurality of intermediate computations. These Lagrange coefficients $\lambda_n$ may correspond to the cryptographic devices 604 and 606 that produced the plurality of partial computations. The Lagrange coefficients may have been generated by the trusted external server during the secret share provisioning process (described above with reference to FIG. 5). The client computer 602 may have received these Lagrange coefficients from the trusted external server prior to the distributed symmetric encryption process.

As stated above, the plurality of intermediate computations may be combined by calculating a product of the plurality of intermediate computations. This plurality of intermediate computations may be equivalent to the product of the first commitment $h_1$ and the second commitment $h_2$ encrypted using the first secret value $S_1$ and the second secret value $S_2$ respectively. In some embodiments, the combination of intermediate computations may be used as a symmetric cryptographic key. In others, the combination of intermediate computations may be used as a key generation seed. The key generation seed may be input to a key generation function to produce the cryptographic key y.

At step 628, the client computer 602 may generate a verification signature z based on the plurality of partial signatures $z_n$. The client computer may use a TA.CombineSig function using the partial signatures as inputs. In some embodiments, combining partial signatures to generate a verification signature may be similar to combining partial computations to generate the cryptographic key. In some embodiments, generating the verification signature may involve calculating a product of the partial signatures.

At step 630, the client computer 602 can generate a ciphertext e by encrypting the message m using the cryptographic key y. The client computer can use any appropriate symmetric cryptosystem (such as AES) to perform this encryption. Optionally, the client computer may generate the ciphertext by encrypting the message m and a random value r using the cryptographic key. This may be useful in cases where one or both of the first and second commitments $h_1$ and $h_2$ where generated using the random value.

At step 632, the client computer 622 can generate a payload comprising the ciphertext e, the first commitment $h_1$, and the second commitment $h_2$. Optionally, the payload may additionally comprise the verification signature z, the random value r, and a hash indicator. The payload may comprise the ciphertext and all data needed to decrypt the ciphertext (e.g., the first commitment and the second commitment). It may also comprise data needed to verify legitimate use of the distributed cryptographic system (the verification signature) and data needed to validate or otherwise verify the commitments (the random value and the hash indicator). The hash indicator may comprise an identifier indicating which hash functions were used to generate the first commitment and the second commitment. For example, the hash indicator may comprise the string "SHA-256, BLAKE2", indicating that the first commitment was generated using the SHA-256 hashing algorithm and the second commitment was generated using the BLAKE2 hashing algorithm.

The client computer 602 may store the payload and decrypt it at a later time. For example, the client computer 602 may comprise a hospital computer system, and the message may comprise a sensitive medical record. The client computer 602 may encrypt the medical record and generate the payload in order to securely store the sensitive medical record in a medical database. At a later time (e.g., during a patient visit), the client computer 602 may retrieve the payload in order to decrypt the ciphertext and retrieve the medical record.

Alternatively, the client computer 602 may transmit the payload to another client computer, which may use the information in the payload to decrypt the ciphertext and retrieve the message. For example, this may be useful when the message comprises sensitive payment information. The client computer 602 could comprise a payment terminal associated with a merchant. When a customer makes a payment using the client computer 602, the client computer could encrypt the customer's payment information and generate a payload, then send the payload to a bank computer corresponding to that customer (e.g., a bank that maintains an account on behalf of that customer). The bank computer could use the information in the payload to decrypt the customer's payment information and enact a payment between the merchant and the customer.

B. Decryption

Figure 7A:
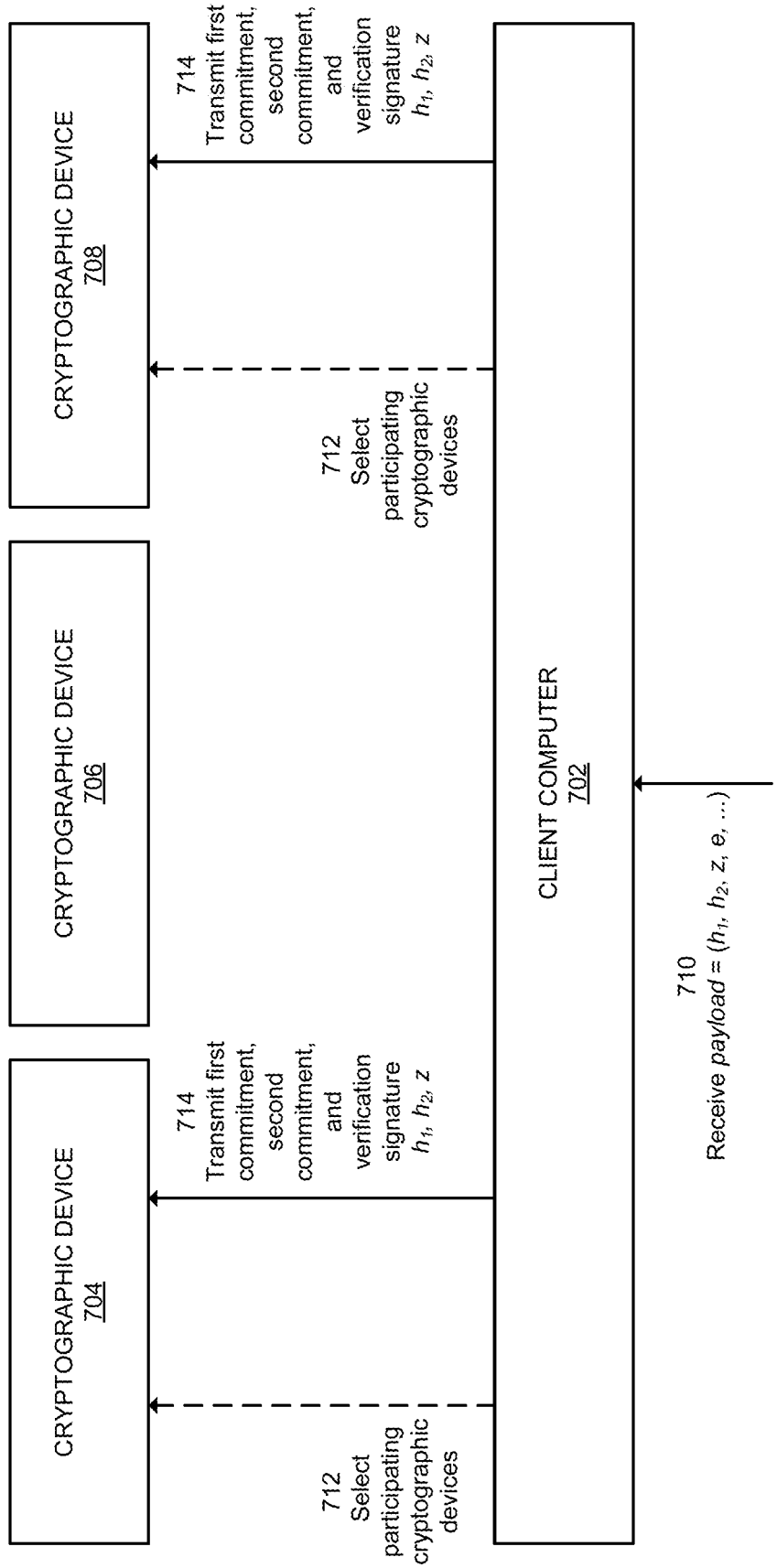
FIG. 7A shows a hybrid sequence diagram for a first part of an exemplary method of adaptive attack resistant distributed symmetric decryption.

FIG. 7A shows a first part of an exemplary method of adaptive attack resistant distributed symmetric decryption according to some embodiments. FIG. 7A shows a client computer 702 along with three cryptographic devices 704, 706, and 708. The client computer 702 may be the same client computer 602 from FIGS. 6A and 6B or a different client computer. Likewise, cryptographic devices 704-708 may be the same as cryptographic devices 604-608 from FIGS. 6A and 6B or different cryptographic devices. Although a proxy device and communications network are not shown, in some embodiments, communications between the client computer 702 and cryptographic devices 704-708 may be mediated or transmitted via a proxy device and/or a communications network.

At step 710, the client computer 702 can receive a payload comprising a ciphertext e, a first commitment $h_1$ and a second commitment $h_2$. The first commitment $h_1$ may have been generated using a message m and a first hash function $H_1$ (as described with reference to FIG. 6A). Likewise, the second commitment $h_2$ may have been generated using the message and a second hash function $H_2$. The payload may additionally comprise a verification signature z, a random value r, and a hash indicator. The client computer 702 may receive this payload from another client computer (e.g., client computer 602 from FIGS. 6A and 6B). Alternatively, client computer 702 may have originally generated the payload and may receive the payload by retrieving it from memory.

At step 712, the client computer 702 can select a predetermined threshold number of participating cryptographic devices. The threshold number of cryptographic devices may comprise the minimum number of participating cryptographic devices needed to perform distributed symmetric decryption. In FIG. 7A, the client computer 702 selects cryptographic devices 704 and 708. Notably, the same cryptographic devices used to produce the ciphertext (e.g., cryptographic devices 604 and 606) do not need to participate in decrypting the ciphertext.

The client computer 702 may select the participating cryptographic devices via any appropriate means or selection criteria. For example, the client computer 702 may select the participating cryptographic devices randomly, or according to a trust score or security score. For example, a trust or security score may relate to the likelihood that a particular cryptographic device has been compromised by a hacker, or by the relative security of the hardware of that cryptographic device (e.g., the trust score may depend on whether the cryptographic device possesses secure memory or a trusted platform module). The client computer 702 may select the participating cryptographic devices using a proxy device (not shown). The client computer 702 may transmit a request to the proxy device requesting a threshold number of participating cryptographic devices. The proxy device may then select the participating cryptographic devices on behalf of the client computer 702.

At step 714, the client computer can transmit a decryption request including the first commitment $h_1$ and the second commitment $h_2$ to each of a plurality of cryptographic devices (i.e., participating cryptographic devices 704 and 708). The decryption request may additionally comprise the verification signature z. The client computer 702 may transmit the request via a proxy device, such that the client computer transmits the first commitment and the second commitment to the proxy device and the proxy device transmits the first commitment and the second commitment to the plurality of participating cryptographic devices.

Figure 7B:
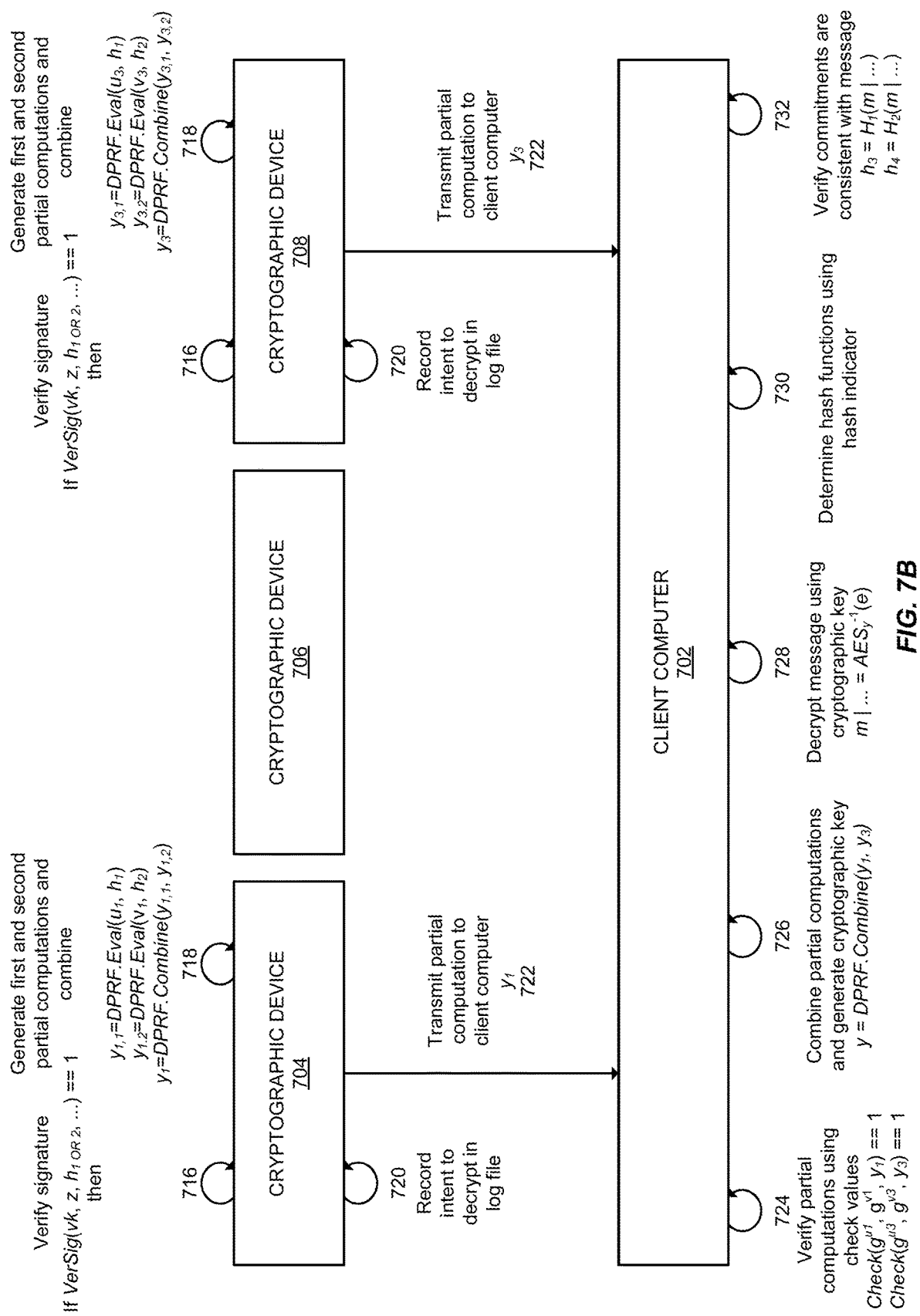
FIG. 7B shows a hybrid sequence diagram for a second part of an exemplary method of adaptive attack resistant distributed symmetric decryption.

FIG. 7B shows the second part of the exemplary method of distributed symmetric decryption according to some embodiments. At step 716, optionally, the participating cryptographic devices (i.e., cryptographic device 704 and cryptographic device 708) can verify the verification signature z using a verification key vk and the first commitment $h_1$ and/or the second commitment $h_2$. The participating cryptographic devices may verify the verification signature using a VerSig function, which takes the verification signature, the verification key, and the first commitment and/or the second commitment as inputs. The VerSig function may produce an output of 1 or "TRUE" if the verification signature is legitimate and may produce an output of 0 or "FALSE" if the verification signature is illegitimate.

In some embodiments, the signature verification process may comprise decrypting the verification signature using the verification key to produce an additional commitment $h_a$. The participating cryptographic devices can then compare the additional commitment $h_a$ to the first commitment $h_1$, the second commitment $h_2$, and/or a combination thereof (e.g., the product of the first commitment $h_1$ and the second commitment $h_2$). The signature verification process may be dependent on the process used to generate the verification signature. For example, if the verification signature is generated solely based on the first commitment $h_1$, the signature verification process may comprise comparing the first commitment $h_1$ against the additional commitment $h_a$.

In some embodiments, the verification signature may comprise a commitment (e.g., the first commitment or the second commitment) encrypted using a verification value. The verification key may correspond to the verification value. For example, the verification key may comprise a public key corresponding to a private key verification value. The participating cryptographic devices may verify the verification signature by decrypting the verification signature using the verification key, then comparing the output to the first commitment or the second commitment. If the output matches the first commitment or the second commitment, the verification signature is legitimate.

At step 718, the participating cryptographic devices can each generate a first partial computation $y_{n,1}$ and a second partial computation $y_{n,2}$. The participating cryptographic devices can then combine their respective first and second partial computations to produce a partial computation $y_n$.

As described with reference to FIG. 6B, each participating cryptographic device can generate their first partial computation $y_{n,1}$ using a respective first secret share $u_n$ and the first commitment $h_1$. The participating cryptographic devices may generate these first partial computations using a DPR- F.Eval function, which evaluates a distributed pseudorandom function using the first commitment and the first secret share as arguments. In some embodiments, the distributed pseudorandom function may comprise an elliptic curve cryptographic function implementing elliptic curve cryptography. That is, the cryptographic devices may use the DPRF.Eval function to encrypt the first commitment using their respective first secret shares as cryptographic keys. In doing so, each cryptographic device 604 and 606 may produce a first partial computation.

The second partial computations $y_{n,2}$ can be generated using the respective second secret shares $v_n$ and the second commitment $h_2$ in a similar manner. As an example, the cryptographic devices 704 and 708 can use a DPRF.Eval function (such as an elliptic curve cryptography function) to encrypt the second commitment using the second secret share as a cryptographic key, thereby producing the second partial computations.

As stated above, in some embodiments, the first partial computation $y_{n,1}$ and the second partial computation $y_{n,2}$ can be generated by evaluating a distributed pseudorandom function, such as an elliptic curve cryptography function. This may comprise the cryptographic devices 704 and 708 encrypting the first commitment $h_1$ and the second commitment $h_2$ using the first secret share $s_{n,1}$ and the second secret share $S_{n,2}$ to produce the first partial computation and the second partial computation respectively. In an elliptic curve cryptosystem, this may comprise converting the first commitment and the second commitment into points in an elliptic curve group, then exponentiating those points using the first secret share and second secret share, i.e., $y_{n,1}=h_1^{s_{n,1}}$ and $y_{n,2}=h_2^{s_{n,2}}$.

The cryptographic devices 704 and 708 may each combine their respective first partial computation $y_{n,1}$ and second partial computation $y_{n,2}$ to produce partial computations $y_n$. These partial computations may be used by the client computer 702 to generate a cryptographic key at a later time. The cryptographic devices 704 and 708 may use a DPRF.Combine($y_{n,1}$, $y_{n,2}$) function with the respective first partial computation and second partial computation as inputs to produce the output partial computations. In some embodiments, the DPRF.Combine function may comprise a product function that calculates the product of the two partial computations. For example, the cryptographic devices 704 and 708 may produce their respective partial computations $y_n$ using the following formula: $y_n=y_{n,1}*y_{n,2}=h_1^{s_{n,1}}*h_2^{s_{n,2}}$.

At step 720, the cryptographic devices 704 and 708 may optionally record that the client computer 702 intends to decrypt the message m in a log file. The cryptographic devices 704 and 708 may determine that the client computer 702 intends to decrypt the message based on the presence of the verification signature z, as a verification signature may not be needed to perform encryption. Recording the behavior of client computers in log files can help prevent misuse of the distributed cryptographic system, and may be useful for security audits.

At step 722, the cryptographic devices 704 and 708 can transmit their respective partial computations $y_n$ to the client computer 702. In some embodiments, the client computer 702 may receive this plurality of partial computations from a proxy device, wherein the proxy device receives the plurality of partial computations from the participating cryptographic devices 704 and 708.

In some embodiments, the partial computations received by the client computer 702 at step 722 may be referred to as "additional partial computations," for example, because they are received in addition to partial computations used in a distributed encryption process (e.g., the partial computations received by client computer 602 at step 622 in FIG. 6B). This may be the case when client computer 702 is using the cryptographic device network to decrypt data it had previously encrypted (e.g., sensitive files stored on a hard drive). In this case, the term additional partial computation distinguishes the partial computations used in encryption and decryption, however, it should be understood that one or more additional partial computations may be the same as one or more partial computations used in encryption (if for example, the same cryptographic devices participate in the encryption and decryption operations).

At step 724, the client computer 702 can retrieve a plurality of check values $g^{um}$, and r and verify the partial computations $y_n$ using the plurality of check values. As described above with reference to FIG. 5, a trusted external server that produced the secret values and secret shares may publish the check values. The client computer may retrieve these published check values from the trusted external server, for example, via a web request. The client computer 702 may perform an honest verifier zero knowledge (HVZK) proof in order to verify these partial computations. The client computer 702 may use a Check function in order to execute the HVZK proof. The client computer 702 can invoke HVZK proving procedures in parallel for each check value (e.g., invoking an HVZK proving procedure for $g^{um}$ and another HVZK proving procedure for $g^{vn}$). The Check function may execute the HVZK proof according to any appropriate protocol as described above with reference to FIG. 6 (e.g., Schnorr's protocol, Fiat-Shamir, etc.).

At step 726, the client computer 702 may combine the plurality of partial computations to produce a cryptographic key y. This cryptographic key may be used by the client computer 702 to decrypt the ciphertext e in order to produce the message m. The client computer 702 may combine the partial computations using a DPRF.Combine($y_1$, $y_3$) function, which may take the plurality of partial computations as an input and produce a symmetric cryptographic key or a key generation seed that can be used to generate a symmetric cryptographic key. The DPRF.Combine function executed by the client computer 702 may be similar to the DPRF.Combine function executed by cryptographic devices 704 and 708, in that it is used to combine multiple partial computations into a single output. In some embodiments, both functions combine the partial computations by calculating a product of the partial computations. However, the DPRF.Combine function executed by the client computer 702 may first generate intermediate calculations by exponentiating each partial computation $y_n$ with its corresponding Lagrange coefficient $\lambda_n$ (i.e., $y_n^{\lambda_n}$) before calculating the product of those intermediate calculations. In some embodiments, the output of the DPRF.Combine function y may be calculated using the formula $y=\Pi_i y_i^{\lambda_i}=\Pi_i(h_{i,1}^{s_{i,1}}+h_{i,2}^{s_{i,2}})^{\lambda_n}$.

These intermediate calculations may then be combined to produce the cryptographic key or key generation seed. The client computer 702 may exponentiate each partial computation $y_n$ of the plurality of partial computations using a respective Lagrange coefficient $\lambda_n$ (i.e., $y_n^{\lambda_n}$) as described above in Section I, in order to produce a plurality of intermediate computations. These Lagrange coefficients $\lambda_n$ may correspond to the cryptographic devices 704 and 708 that produced the plurality of partial computations. The Lagrange coefficients may have been generated by the trusted external server during the secret share provisioning process (described above with reference to FIG. 5). The client computer 702 may have received these Lagrange coefficients from the trusted external server prior to the distributed symmetric encryption process.

As stated above, the plurality of intermediate computations may be combined by calculating a product of the plurality of intermediate computations. This plurality of intermediate computations may be equivalent to the product of the first commitment $h_1$ and the second commitment $h_2$ encrypted using the first secret value $S_1$ and the second secret value $S_2$ respectively. In some embodiments, the combination of intermediate computations may be used as a symmetric cryptographic key. In others, the combination of intermediate computations may be used as a key generation seed. The key generation seed may be input to a key generation function to produce the cryptographic key y.

At step 728, the client computer 702 can decrypt the ciphertext e using the cryptographic key y to produce the message m. The client computer can use any appropriate symmetric cryptosystem (such as AES) to perform this encryption. Optionally, the client computer may produce the message and a random value r by decrypting the ciphertext. The random value may be useful in verifying the first commitment $h_1$ and the second commitment $h_2$ at a later step.

At optional step 730, the client computer 702 can determine the first hash function $H_1$ used to generate the first commitment $h_1$ and the second hash function $H_2$ used to generate the second commitment $h_2$ using a hash indicator. The hash indicator may uniquely identify the first hash function and the second hash function. For example the hash indicator may comprise a string such as "BLAKE2, SHA-256", indicating that the first hash function is the BLAKE2 hash function, and the second hash function is the SHA-256 hash function.

At optional step 732, the client computer 702 may verify that the first commitment $h_1$ and second commitment $h_2$ are consistent with the message m. The client computer 702 may perform this verification by generating a third commitment $h_3$ and a fourth commitment $h_4$. The third commitment may be generated using the message and the first hash function (identified in optional step 730) and optionally a random value r. The fourth commitment may be generated using the message and the second hash function (identified in optional step 730) and optionally the random value. Because the first commitment and third commitment are generated using the same hash function, the same message and optionally the same random value, they should be equal. Likewise, because the second commitment and the fourth commitment are generated using the same hash function, the same message, and optionally the same random value, they should be equal. Thus the client computer 702 can verify the message by comparing the first commitment to the third commitment and by comparing the second commitment to the fourth commitment. If the commitments do not match, it may indicate that the message has been tampered with.

V. Computer System

Figure 8:
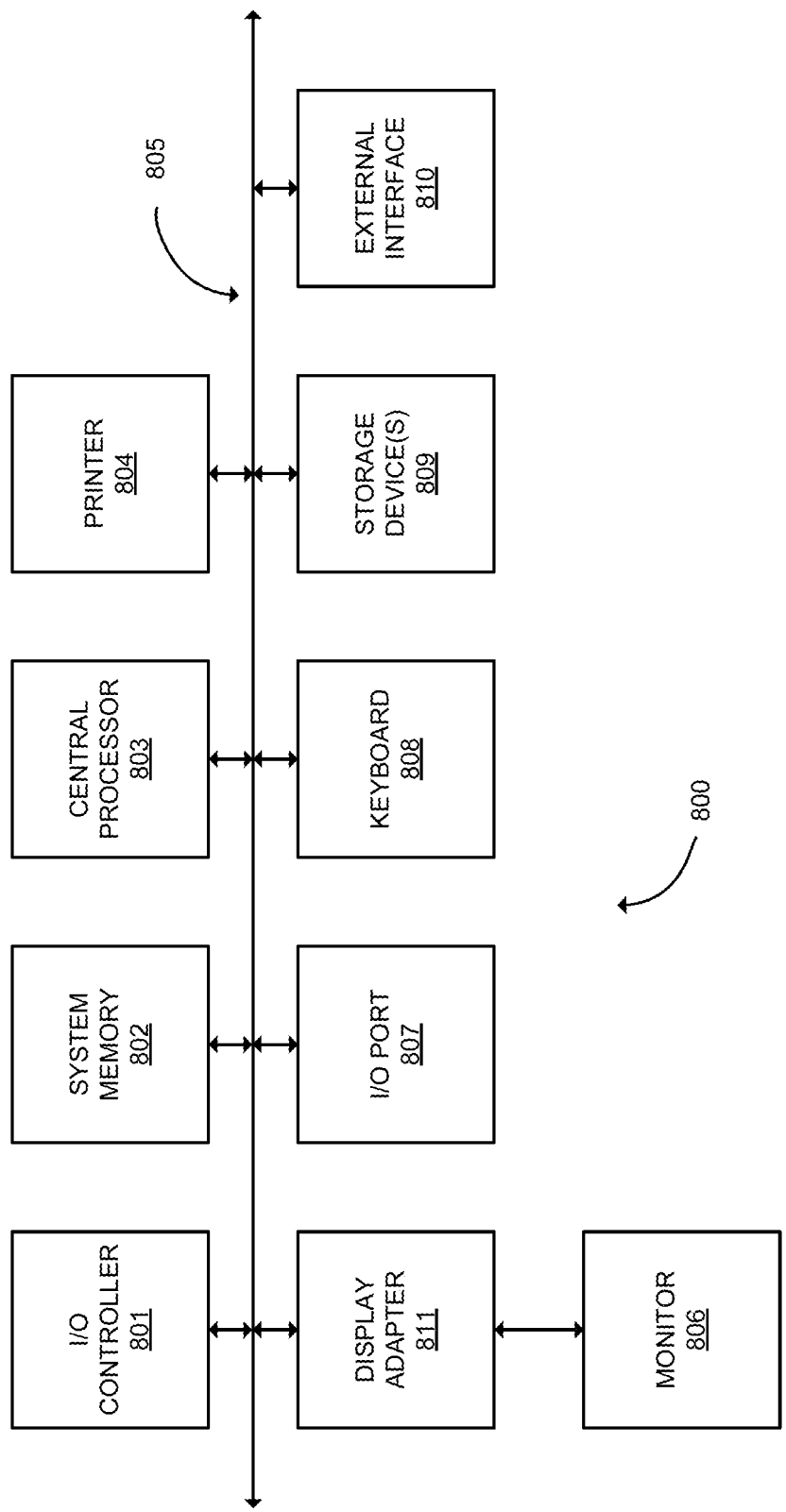
FIG. 8 shows an exemplary computer system according to some embodiments.

Any of the computer systems mentioned herein may utilize any suitable number of subsystems. Examples of such subsystems are shown in FIG. 8 in computer system 800. In some embodiments, a computer system includes a single computer apparatus and the subsystems may comprise components of the computer apparatus. In other embodiments, a computer system can include multiple computer apparatuses, each being a subsystem with internal components.

The subsystems shown in FIG. 8 are interconnected via a system bus 1005. Additional subsystems such as a printer 804, keyboard 808, storage device(s) 809, monitor 806 (coupled to display adapter 811), and others are shown. Peripherals and input/output (I/O) devices which couple to I/O controller 801, can be connected to the computer system by any number of means known in the art such as input/output (I/O) port 807 (e.g., USB, FireWire®). For example, I/O port 807 or external interface 810 (e.g. Ethernet, Wi-Fi, etc.) can be used to connect computer system 800 to a wide area network such as the Internet, a mouse input device, or a scanner. The interconnection via system bus 805 allows the central processor 803 to communicate with each subsystem and to control the execution of instructions from system memory 802 or the storage device(s) 809 (e.g., a fixed disk, such as a hard drive or optical disk), as well as the exchange of information between subsystems. The system memory 802 and/or the storage device(s) 809 may embody a computer readable medium. Any of the data mentioned herein can be output from one component to another component and can be output to the user.

A computer system can include a plurality of the same components or subsystems, e.g., connected together by external interface 810 or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising performing, by a computer system:
   generating a first commitment using a message and a first hash function;
   generating a second commitment using the message and a second hash function;
   transmitting a request including the first commitment and the second commitment to each of a plurality of cryptographic devices, the plurality of cryptographic devices storing a first plurality of secret shares that are generated from a first secret value and a second plurality of secret shares that are generated from a second secret value;
   receiving, from the plurality of cryptographic devices, a plurality of partial computations, wherein each partial computation of the plurality of partial computations was generated by a respective one of the plurality of cryptographic devices using a respective first partial computation and a respective second partial computation, wherein the respective first partial computation is generated using a respective first secret share and the first commitment, and wherein the respective second partial computation is generated using a respective second secret share and the second commitment;
   generating a cryptographic key based on the plurality of partial computations;
   generating a ciphertext by encrypting the message using the cryptographic key;
   generating a payload comprising the ciphertext, the first commitment, and the second commitment, wherein the payload additionally comprises a verification signature that is generated by:
   receiving, from the plurality of cryptographic devices, a plurality of partial signatures, wherein each partial signature of the plurality of partial signatures was generated by a respective one of the plurality of cryptographic devices using a respective verification share of a plurality of verification shares and the first commitment and/or the second commitment; and
   generating the verification signature based on the plurality of partial signatures.

2. The method of claim 1, further comprising, after receiving the plurality of partial computations from the plurality of cryptographic devices:
   retrieving a plurality of check values, the plurality of check values corresponding to the plurality of partial computations; and
   verifying the plurality of partial computations using the plurality of check values.

3. The method of claim 1, wherein:
   generating the first commitment using the message and the first hash function additionally comprises using a random value;
   generating the second commitment using the message and the second hash function additionally comprises using the random value; and
   generating a ciphertext by encrypting the message using the cryptographic key comprises generating a ciphertext by encrypting the message and the random value using the cryptographic key.

4. The method of claim 1, further comprising, prior to generating the first commitment and the second commitment:
   randomly selecting the first hash function and the second hash function from a plurality of hash functions.

5. The method of claim 1, wherein:
   transmitting the first commitment and the second commitment to the plurality of cryptographic devices comprises transmitting the first commitment and the second commitment to a proxy device, wherein the proxy device transmits the first commitment and the second commitment to the plurality of cryptographic devices; and
   receiving the plurality of partial computations from the plurality of cryptographic devices comprises receiving, from the proxy device, the plurality of partial computations, wherein the proxy device receives the plurality of partial computations from the plurality of cryptographic devices.

6. The method of claim 1, wherein the plurality of cryptographic devices comprises at least a predetermined threshold number of cryptographic devices, and wherein the predetermined threshold number of cryptographic devices is less than a total number of cryptographic devices.

7. The method of claim 1, wherein generating the cryptographic key based on the plurality of partial computations comprises:
   exponentiating each partial computation of the plurality of partial computations using a respective Lagrange coefficient, thereby generating a plurality of intermediate computations;

calculating a product of the plurality of intermediate computations; and generating the cryptographic key based on the product of the plurality of intermediate computations.

8. The method of claim 1, further comprising:

transmitting the first commitment and the second commitment to each of a plurality of additional cryptographic devices, the plurality of additional cryptographic devices storing a third plurality of secret shares that are generated from the first secret value and a fourth plurality of secret shares that are generated from the second secret value;

receiving, from the plurality of additional cryptographic devices, a plurality of additional partial computations, wherein each of the plurality of additional partial computations was generated by a respective one of the plurality of additional cryptographic devices using a respective third partial computation and a respective fourth partial computation, wherein the respective third partial computation is generated using a respective third secret share and the first commitment, and wherein the respective fourth partial computation is generated using a respective fourth secret share and the second commitment;

generating the cryptographic key based on the additional plurality of partial computations; and decrypting the ciphertext using the cryptographic key to produce the message.

9. The method of claim 8, wherein:

one or more cryptographic devices of the plurality of cryptographic devices are the same as one or more additional cryptographic devices of the plurality of additional cryptographic devices;

one or more first secret shares of the first plurality of secret shares are the same as one or more fourth secret shares of the fourth plurality of secret shares; and one or more second secret shares of the second plurality of secret shares are the same as one or more fourth secret shares of the fourth plurality of secret shares.

10. A method comprising performing, by a computer system:

receiving a payload comprising a ciphertext, a first commitment, and a second commitment;

transmitting a request including the first commitment and the second commitment to each of a plurality of cryptographic devices, the plurality of cryptographic devices storing a first plurality of secret shares that are generated from a first secret value and a second plurality of secret shares that are generated from a second secret value;

receiving, from the plurality of cryptographic devices, a plurality of partial computations, wherein each partial computation of the plurality of partial computations was generated by a respective one of the plurality of cryptographic devices using a respective first partial computation and a respective second partial computation, wherein the respective first partial computation is generated using a respective first secret share and the first commitment, and wherein the respective second partial computation is generated using a respective second secret share and the second commitment;

generating a cryptographic key based on the plurality of partial computations; and decrypting the ciphertext using the cryptographic key to produce a message, wherein:

the payload additionally comprises a verification signature;

the request additionally comprises the verification signature; and the plurality of cryptographic devices verify the verification signature using a verification key, the first commitment and/or the second commitment.

11. The method of claim 10, wherein the first commitment was generated using the message and a first hash function, wherein the second commitment was generated using the message and a second hash function, wherein the payload additionally comprises a hash indicator and wherein the method further comprises:

determining the first hash function and the second hash function using the hash indicator;

generating a third commitment using the message and the first hash function;

generating a fourth commitment using the message and the second hash function; and verifying the message by comparing the first commitment to the third commitment and comparing the second commitment to the fourth commitment.

12. The method of claim 11, wherein:

the first commitment was generated using a random value in addition to the message and the first hash function;

the second commitment was generated using the random value in addition to the message and the second hash function;

the third commitment is generated using the random value in addition to the message and the first hash function; and the fourth commitment is generated using the random value in addition to the message and the second hash function.

13. A method comprising performing, by a cryptographic device:

receiving, from a client computer, a request including a first commitment generating using a message and a first hash function, and a second commitment generated using the message and a second hash function;

generating a first partial computation based on a first secret share and the first commitment;

generating a second partial computation based on a second secret share and the second commitment;

generating a partial computation by combining the first partial computation and the second partial computation;

transmitting the partial computation to the client computer, thereby enabling the client computer to: (1) generate a cryptographic key using the partial computation, (2) encrypt the message using the cryptographic key, thereby generating a ciphertext, and (3) generate a payload comprising the ciphertext, the first commitment, and the second commitment;

generating a partial signature based on the first commitment and/or the second commitment, and a verification share; and transmitting the partial signature to the client computer, thereby enabling the client computer to generate a verification signature using the partial signature.

14. The method of claim 13, further comprising, prior to receiving the request from the client computer, receiving the first secret share and the second secret share from a trusted external server, wherein the trusted external server also transmits one or more other secret shares to one or more other cryptographic devices.

15. The method of claim 13, further comprising:
receiving, from the client computer, the verification signature, the first commitment, and the second commitment;
verifying the verification signature using a verification key and the first commitment and/or the second commitment;
generating the first partial computation based on the first commitment and the first secret share;
generating the second partial computation based on the second commitment and the second secret share;
generating the partial computation by combining the first commitment and the second commitment; and
transmitting the partial computation to the client computer, wherein the client computer uses the partial computation to generate the cryptographic key and uses the cryptographic key to decrypt the ciphertext to produce the message.

16. The method of claim 15, wherein verifying the verification signature using the verification key and the first commitment and/or second commitment comprises:
decrypting the verification signature using the verification key to produce an additional commitment; and
comparing the additional commitment to the first commitment, the second commitment, and/or a combination thereof.

17. The method of claim 15, further comprising:
receiving, from the client computer, an indicator indicating that the client computer intends to decrypt the message; and
recording that the client computer intends to decrypt the message in a log file.

* * * * *